(12) United States Patent
Rolle et al.

(10) Patent No.: US 12,541,617 B2
(45) Date of Patent: Feb. 3, 2026

(54) REDUCING RESOURCE CONSUMPTION FOR CROSS-TENANT KERNEL SERVICES

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 18/077,493

(22) Filed: Dec. 8, 2022

(65) Prior Publication Data

US 2024/0193298 A1 Jun. 13, 2024

(51) Int. Cl.
*G06F 21/62* (2013.01)
*G06F 9/54* (2006.01)

(52) U.S. Cl.
CPC .......... *G06F 21/6236* (2013.01); *G06F 9/546* (2013.01)

(58) Field of Classification Search
CPC .............................. G06F 21/6236; G06F 9/546
See application file for complete search history.

(56) References Cited

U.S. PATENT DOCUMENTS

| | | | |
|---|---|---|---|
| 17,186 A | 5/1857 | Atwater | |
| 17,457 A | 6/1857 | Tidgewell | |
| 7,308,704 B2 | 12/2007 | Vogel et al. | |
| 7,350,237 B2 | 3/2008 | Vogel et al. | |
| 7,685,605 B1 | 3/2010 | Ahmed et al. | |
| 7,831,567 B2 | 11/2010 | Luther et al. | |
| 8,484,351 B1 | 7/2013 | Dean et al. | |
| 8,566,193 B2 | 10/2013 | Singh et al. | |
| 9,405,429 B1 | 8/2016 | Gopalakrishnan | |
| 9,703,813 B2 | 7/2017 | Hegde et al. | |

(Continued)

FOREIGN PATENT DOCUMENTS

| | | |
|---|---|---|
| CA | 2922139 | 11/2021 |
| CA | 3096061 | 4/2023 |

(Continued)

OTHER PUBLICATIONS

Non-Final Office Action in U.S. Appl. No. 17/702,013, mailed on Jan. 4, 2024, 9 pages.

(Continued)

*Primary Examiner* — Rupal Dharia
*Assistant Examiner* — Raghavender Cholleti
(74) *Attorney, Agent, or Firm* — Fish & Richardson P.C.

(57) ABSTRACT

The present disclosure involves systems, software, and computer implemented methods for integrating data privacy integration protocols across system landscapes. One example method includes receiving, at a first tenant of a kernel service, a message from a first application in a first landscape. Data from the message is provided to a core component of the kernel service that communicates with multiple tenants of the kernel service. The core component stores data from the message in a core storage area accessible by multiple tenants of the kernel service. The first tenant performs, in the first landscape, a first processing of the message using data in the core storage area for which the first tenant is authorized. The core component initiates a second processing of the message by a second tenant of the kernel service in a second landscape using data in the core storage area for which the second tenant is authorized.

20 Claims, 11 Drawing Sheets

(56) References Cited

U.S. PATENT DOCUMENTS

| | | |
|---|---|---|
| 9,904,796 B2 | 2/2018 | Pluder et al. |
| 10,387,810 B1 | 8/2019 | Kalush et al. |
| 10,409,790 B2 | 9/2019 | Lehnert et al. |
| 10,430,413 B2 | 10/2019 | Christoph et al. |
| 10,552,642 B2 | 2/2020 | Rolle et al. |
| 10,642,805 B1 | 5/2020 | Masse |
| 10,754,932 B2 | 8/2020 | Wiederspohn et al. |
| 10,776,254 B1 | 9/2020 | Dhayanithi |
| 10,812,608 B1* | 10/2020 | Thummala Abbigari ............... H04L 67/55 |
| 10,839,099 B2 | 11/2020 | Vogel et al. |
| 10,909,222 B1 | 2/2021 | Fregly et al. |
| 11,042,654 B2 | 6/2021 | Nos et al. |
| 11,113,417 B2 | 9/2021 | Rolle |
| 11,200,331 B1* | 12/2021 | Bouaichi ............... H04L 9/0897 |
| 11,615,059 B2 | 3/2023 | Kottomtharayil et al. |
| 11,630,673 B2 | 4/2023 | Grant |
| 11,675,651 B2 | 6/2023 | Li et al. |
| 11,720,367 B2 | 8/2023 | Wallach |
| 11,765,045 B1 | 9/2023 | Nguyen et al. |
| 11,899,655 B2 | 2/2024 | Malik et al. |
| 11,921,905 B2 | 3/2024 | Savagaonkar et al. |
| 11,941,151 B2* | 3/2024 | Mendoza ............ G06F 21/6254 |
| 11,947,662 B2 | 4/2024 | Gingell et al. |
| 11,962,576 B2 | 4/2024 | Sapek et al. |
| 11,994,966 B2 | 5/2024 | Anthonappa et al. |
| 12,045,242 B2 | 7/2024 | Srivastava et al. |
| 12,056,255 B1 | 8/2024 | Mystetskyi et al. |
| 12,182,284 B2 | 12/2024 | Rolle |
| 2004/0187047 A1 | 9/2004 | Rathunde et al. |
| 2007/0089117 A1 | 4/2007 | Samson |
| 2008/0060051 A1 | 3/2008 | Lim |
| 2008/0091807 A1* | 4/2008 | Strub ............... H04L 41/5064 709/223 |
| 2008/0174425 A1 | 7/2008 | Torning |
| 2008/0244016 A1 | 10/2008 | Parthasarathy et al. |
| 2008/0301175 A1* | 12/2008 | Applebaum ...... G06F 16/24565 707/999.102 |
| 2008/0312982 A1 | 12/2008 | Braun et al. |
| 2009/0210394 A1 | 8/2009 | Saravanan et al. |
| 2009/0228340 A1 | 9/2009 | Bohannon |
| 2012/0036507 A1 | 2/2012 | Jonnala et al. |
| 2012/0221444 A1* | 8/2012 | Bowes ............... G06Q 10/06 705/30 |
| 2013/0066977 A1* | 3/2013 | Katti ............... H04L 51/23 709/206 |
| 2013/0132696 A1 | 5/2013 | Tomida et al. |
| 2013/0347064 A1 | 12/2013 | Aissi |
| 2014/0032600 A1 | 1/2014 | Sarferaz et al. |
| 2014/0059458 A1 | 2/2014 | Levien et al. |
| 2014/0109238 A1 | 4/2014 | Ravindran |
| 2014/0188572 A1 | 7/2014 | Hegde et al. |
| 2014/0267770 A1 | 9/2014 | Gervautz et al. |
| 2015/0242531 A1 | 8/2015 | Rodniansky |
| 2016/0148143 A1 | 5/2016 | Anderson et al. |
| 2016/0292455 A1 | 10/2016 | Jebara |
| 2017/0006135 A1 | 1/2017 | Siebel et al. |
| 2017/0091479 A1 | 3/2017 | Pluder et al. |
| 2018/0101164 A1 | 4/2018 | Noetzelmann et al. |
| 2018/0322279 A1 | 11/2018 | Beskorovajnov et al. |
| 2019/0018985 A1 | 1/2019 | Rolle et al. |
| 2019/0132276 A1* | 5/2019 | Scheiber ............... H04L 67/12 |
| 2019/0156445 A1 | 5/2019 | Markham et al. |
| 2019/0236294 A1 | 8/2019 | McDonald et al. |
| 2019/0236334 A1 | 8/2019 | Babushkin |
| 2020/0019728 A1 | 1/2020 | Rolle |
| 2020/0133554 A1* | 4/2020 | Kishi ............... G06F 16/122 |
| 2020/0167699 A1 | 5/2020 | Cohen |
| 2020/0285766 A1 | 9/2020 | Jois et al. |
| 2020/0293356 A1 | 9/2020 | Bonaud et al. |
| 2020/0380810 A1 | 12/2020 | Unagami et al. |
| 2021/0089678 A1 | 3/2021 | Gkoulalas-Divanis et al. |
| 2021/0192052 A1 | 6/2021 | Loch et al. |
| 2021/0209251 A1 | 7/2021 | Parthasarathy |
| 2022/0043917 A1 | 2/2022 | Rolle |
| 2022/0050834 A1 | 2/2022 | Rolle et al. |
| 2022/0050920 A1 | 2/2022 | Rolle |
| 2022/0058333 A1 | 2/2022 | Rolle |
| 2022/0083513 A1 | 3/2022 | Wong et al. |
| 2022/0100755 A1 | 3/2022 | Rolle |
| 2022/0207429 A1 | 6/2022 | Haribhakti et al. |
| 2022/0277023 A1 | 9/2022 | Rolle et al. |
| 2022/0300837 A1 | 9/2022 | Shmelkin et al. |
| 2022/0309052 A1 | 9/2022 | Rolle |
| 2022/0321566 A1 | 10/2022 | Coyle et al. |
| 2023/0081785 A1 | 3/2023 | Zhang |
| 2023/0111687 A1* | 4/2023 | Mclean ............ G06F 21/6218 726/26 |
| 2023/0237192 A1 | 7/2023 | Kahan et al. |
| 2023/0244637 A1 | 8/2023 | Wu |
| 2023/0379276 A1* | 11/2023 | Roy ............... H04L 67/306 |
| 2024/0005037 A1 | 1/2024 | Chintalapati et al. |
| 2024/0346167 A1 | 10/2024 | Vogel et al. |
| 2024/0370582 A1 | 11/2024 | Rolle et al. |

FOREIGN PATENT DOCUMENTS

| | | |
|---|---|---|
| CN | 108664805 | 10/2018 |
| CN | 112818372 | 5/2021 |
| CN | 113095348 | 7/2021 |
| CN | 113282864 | 8/2021 |
| CN | 114092253 | 2/2022 |
| CN | 115809259 | 3/2023 |
| CN | 116522389 | 8/2023 |
| EP | 1662355 | 5/2006 |
| EP | 3575983 | 12/2019 |
| GB | 2316509 | 2/1998 |
| KR | 10-2006-0004909 | 1/2006 |
| RU | 2459379 | 8/2012 |
| WO | WO 2012061433 | 5/2012 |
| WO | WO 2018170504 | 9/2018 |
| WO | WO 2018131031 | 7/2019 |
| WO | WO 2022211899 | 10/2022 |

OTHER PUBLICATIONS

Non-Final Office Action in U.S. Appl. No. 17/457,811, mailed on Dec. 20, 2023, 27 pages.
Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.
SAP "SAP Asset Manager Security Guide" Dec. 10, 2020, 28 pages.
SAP "SAP Event Stream Processor: Security Guide" Sep. 23, 2019, 58 pages.
U.S. Appl. No. 17/186,934, Rolle et al., Feb. 26, 2021.
U.S. Appl. No. 17/457,797, Ighoroje et al., filed Dec. 6, 2021.
U.S. Appl. No. 17/457,802, Rolle et al., filed Dec. 6, 2021.
U.S. Appl. No. 17/457,811, Rolle et al., filed Dec. 6, 2021.
U.S. Appl. No. 17/457,816, Vogel et al., filed Dec. 6, 2021.
U.S. Appl. No. 17/457,824, Vogel et al., filed Dec. 6, 2021.
U.S. Appl. No. 17/457,827, Ighoroje et al., filed Dec. 6, 2021.
U.S. Appl. No. 17/680,717, Rolle et al., filed Feb. 25, 2022.
U.S. Appl. No. 17/680,741, Rolle et al., filed Feb. 25, 2022.
U.S. Appl. No. 17/680,759, Rolle et al., filed Feb. 25, 2022.
U.S. Appl. No. 17/680,858, Rolle, filed Feb. 25, 2022.
U.S. Appl. No. 17/702,013, Rolle, filed Mar. 23, 2022.
U.S. Appl. No. 17/718,770, Rolle, filed Apr. 12, 2022.
U.S. Appl. No. 18/049,063, Hesse et al., filed Oct. 24, 2022.
U.S. Appl. No. 18/073,164, Rolle et al., filed Dec. 1, 2022.
U.S. Appl. No. 18/074,745, Vogel et al., filed Dec. 5, 2022.
U.S. Appl. No. 18/077,476, Rolle et al., filed Dec. 8, 2022.
Wikipedia.org [online], "Hyperscale computing" created on May 2013, retrieved on Dec. 1, 2022, retrieved from URL <https://en.wikipedia.org/wiki/Hyperscale_computing>, 2 pages.
Wikipedia.org [online], "Information privacy" created on May 2003, retrieved on Dec. 6, 2021, retrieved from URL <https://en.wikipedia.org/wiki/Information_privacy>, 7 pages.

(56) References Cited

OTHER PUBLICATIONS

Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.
Wikipedia.org [online], "Personal Identifier" created on Feb. 2007, retrieved on Dec. 1, 2022, retrieved from URL <https://en.wikipedia.org/wiki/Personal_identifier>, 3 pages.
Barreto et al, "An Efficient and Fault-Tolerant Update Commitment Protocol for Weakly Connected Replicas" INESC-ID/IST, Sep. 2005, 1059-1068.

* cited by examiner

REDUCING RESOURCE CONSUMPTION FOR CROSS-TENANT KERNEL SERVICES

TECHNICAL FIELD

The present disclosure relates to computer-implemented methods, software, and systems for integrating data privacy integration protocols across system landscapes.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for integrating data privacy integration protocols across system landscapes. An example method includes: receiving, at a first tenant of a kernel service, a message from a first application in a first multiple-application landscape; providing data from the message to a core component of the kernel service that communicates with multiple tenants of the kernel service; storing, by the core component of the kernel service, data from the message in a core storage area accessible by multiple tenants of the kernel service; performing, by the first tenant of the kernel service in the first multiple-application landscape, a first processing of the message using data in the core storage area for which the first tenant of the kernel service is authorized; and initiating, by the core component, a second processing of the message by a second tenant of the kernel service in a second multiple-application landscape using data in the core storage area for which the second tenant of the kernel service is authorized, wherein the second tenant of the kernel service and the first tenant of the kernel service are serviced by a same datacenter.

Implementations can include one or more of the following features. The first tenant of the kernel service can use, during the first processing of the message, first data in a first storage area private to the first tenant of the kernel service along with the data in the core storage area for which the first tenant is authorized. The second tenant of the kernel service can use, during the second processing of the message, second data in a second storage area private to the second tenant of the kernel service along with the data in the core storage area for which the second tenant is authorized. The kernel service can be a master data integration service. The message can be a request to store at least one master data object from the first application by the master data integration service to enable access to the at least one master data object to one or more downstream applications in the first multiple-application landscape and in the second multiple-application landscape. The core storage area can include an original version of each master data object. Configuration metadata can be stored in the core storage area that indicates which applications in the first multiple-application landscape and in the second multiple-application landscape have access to which master data objects in the core storage area. The first data in the first storage area private to the first tenant of the kernel service includes attribute information for at least one object that is accessible to applications in the first multiple-application landscape, but that is not accessible to applications in the second multiple-application landscape. The first tenant can notify the downstream applications in the first multiple-application landscape of an availability of the at least one master data object in the core storage area. The second tenant can notify the downstream applications in the second multiple-application landscape of the availability of the at least one master data object in the core storage area. The kernel service can be a data privacy integration service. The message can be a request to determine whether an operation can be performed on each of at least one object. The data from the message stored in the core storage area can include object identifiers of the at least one object. The operation can be object-blocking or disassociating a purpose from an object. The first processing performed by the first tenant of the kernel service can include the first tenant sending a first request to applications in the first multiple-application landscape for confirmation as to whether the operation can be performed on the at least one object. The second processing performed by the second tenant of the kernel service can include the second tenant sending a second request to applications in the second multiple-application landscape for confirmation as to whether the operation can be performed on the at least one object. The core component can integrate the first processing of the request with the second processing of the request by determining whether each application in the first multiple-application landscape and each application in the second multiple-application landscape can perform the operation. An integration result can be provided for a data privacy integration protocol to the first application in response to the message received from the first application. The first processing by the first tenant can include: dividing the at least one object into at least one first work package; storing first work package information for the at least one first work package in a first private data storage area private to the first tenant; and sending the at least one first work package to applications in the first multiple-application landscape to ask applications in the first multiple-application landscape whether the operation can be performed on each of the at least one object. The second processing by the second tenant can include: dividing the at least one object into at least one second work package, wherein the at least one second work package is a different division of the at least one object than the at least one first work package; storing second work package information for the at least one second work package in a second private data storage area private to the second tenant; and sending the at least one second work package to applications in the second multiple-application landscape to ask applications in the second multiple-application landscape whether the operation can be performed on each of the at least one object.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set

DETAILED DESCRIPTION

Figure 1:
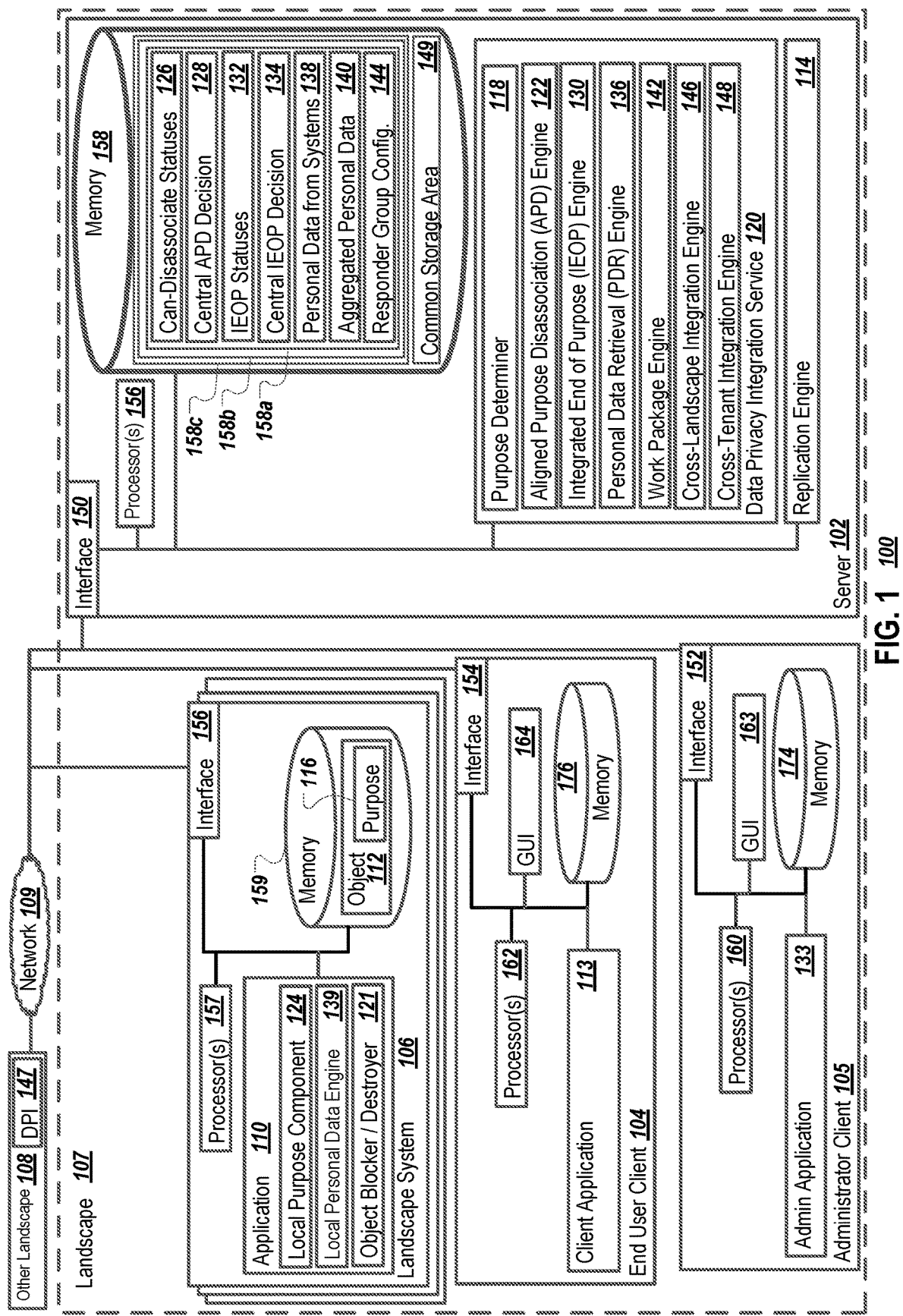
FIG. 1 is a block diagram illustrating an example system for integrating data privacy integration protocols across system landscapes.

An integrated multiple-application landscape can include a data privacy integration (DPI) service that provides various functions for integrating personal data related capabilities of different applications. For example, the DPI service can include protocols related to integrated end-of-purpose (iEoP) processing, integrated personal data retrieval, aligned purpose disassociation (APD), and other protocols. An integrated end-of-purpose protocol can be used to align different applications on a point in time when personal data should be blocked. An integrated personal data retrieval protocol can be used to manage receiving exports of personal data from various applications, so that a common report including personal data concerning a same data subject from multiple applications can be generated. An aligned purpose disassociation protocol can be used to align various applications on when a purpose assignment is removed from a data object. The various DPI protocols can be used on-premise, and/or in cloud environments, and/or in hybrid environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457, 811, filed on Dec. 6, 2021 entitled "INTEGRATED PERSONAL DATA RETRIEVAL ACROSS MULTIPLE APPLICATIONS", and U.S. patent application Ser. No. 17/457, 802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

A landscape is typically associated with a legal entity. A corporation may have different legal entities, for different sub-units, different locales, etc. For instance, an international company might have different legal entities for Germany, France, the United States, etc. Regarding configuration of software assets and systems, an organization may use separate application landscapes for every separate legal entity. Each landscape can be associated with a separate data controller. Regarding DPI configuration, a separate DPI service instance may be used for each different landscape.

While DPI protocols are designed to integrate data protection aspects within a multiple-application software landscape, in some cases or for some organizations, there may be a need to integrate data protection aspects of two or more landscapes with each other, across landscapes. For instance, an application from a first landscape of a first legal entity might replicate master data objects to an application of a second landscape of a second legal entity through direct integration. As another example, a middleware component or other means (e.g., file download/upload, manual user interface entry) may be used for data replication.

In situations in which different landscapes are used for different legal entities, there may be a need or desire to integrate data protection aspects (e.g., with regards to the blocking and destruction of personal data) between the different landscapes. For instance, two landscapes may each include a copy of the same Workforce Person object and data protection integration can ensure that the copy of the object is deleted at a same point in time in both landscapes instead of independent deletion of the object.

While separate DPI service instances in different landscapes can act independently of each other, cross-landscape data integration can be performed by integrating the separate DPI service instances in different landscapes. For example, a first DPI service instance in a first landscape can be considered as a main or primary DPI service instance at which a DPI protocol is initiated, and a second, different DPI service instance in a second landscape can be considered as a dependent DPI service instance. The dependent DPI service instance can function as a veto service towards the main DPI service instance. In this approach, the dependent DPI service instance can participate in the execution of a DPI protocol that was initiated in the first landscape. The second DPI service instance can be treated as a participant application in the protocol initiated in the first landscape, for example. Veto services are described in more detail in the above mentioned incorporated-by-reference patent applications.

Treating the dependent DPI service instance as a veto service can result in various disadvantages, however. For instance, optimizations that may have been realized due to responder-group configurations in the second landscape may be reduced. For instance, applications may expend a non-trivial amount of resources responding to requests from a DPI service.

Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-ofpurpose or aligned purpose disassociation processing, respectively. Other examples include putting applications that are more likely to fail a block application in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which is hereby incorporated by reference.

If the dependent DPI instance is treated as a veto service by the first DPI instance, the entire set of applications in the second landscape may be essentially treated as one responder group (e.g., one responder-group-check, one responder-group-block, etc.) from the perspective of the first DPI instance. In such a configuration, an integrated DPI protocol execution can result in a higher likelihood of protocol failure and higher likelihood of unnecessary computing effort because responders of the dependent DPI service instance might not treated as being in an appropriate responder group relative to responder groups in the main DPI service instance.

For instance, if all second-landscape applications are essentially grouped with first-landscape applications in a first responder group of the first landscape, applications that would normally be treated as applications in a last responder group in the second landscape (e.g., due to having an estimated high amount of resource consumption) would work on the protocol request before, for instance, first-landscape applications in a second responder group in the first landscape. The first-landscape applications in the second responder group in the first landscape may have substantially less processing requirements than second-landscape applications in the last responder group in the second landscape, so having higher-resource consuming applications work on the protocol request first can result in wasted resources if an application needing less resources that is executed later ends up providing a veto vote for a protocol.

As another example, if all second-landscape applications are essentially grouped with first-landscape applications in a last responder group of the first landscape, then applications that would normally be treated as applications in a first responder group in the second landscape (e.g., due to a higher likelihood of failing a protocol operation or providing a veto vote) are instructed to work on protocol requests near the end of the protocol run, even though they have a higher likelihood of failure or veto-voting. The processing performed by the earlier responder groups of the first landscape may be wasted, for example, if an earlier second-landscape responder group application ends up failing or providing a veto vote, as was predicted as more likely than other applications.

As another disadvantage of treating the second landscape as a veto service, a higher risk of protocol failure can occur due to timeout issues when the entire second landscape is treated as a veto service by the first DPI service instance in the first landscape. For instance, with the veto service approach, the first DPI service instance treats the second DPI service instance as a regular application that is expected to respond to a protocol participation request within a configured timeframe. However, the second DPI instance would have to receive ticket details from the first DPI service instance, create work packages for second landscape applications, send work packages for the protocol request to applications in the second landscape (e.g., in responder-group fashion within the second landscape), gather feedback, determine an aggregate status, and, finally, send an aggregate status for the second landscape to the first DPI instance. Such overall processing in the second landscape can be substantial and may result in a higher likelihood of the second DPI service instance not being able to respond before a timeout occurs.

Other approaches can be unsatisfactory or disadvantageous for other reasons. For instance, a representer approach could be used where the first DPI service instance represents, or acts on behalf of, applications in the second landscape. However, such an approach can require an administrator in the first landscape having detailed knowledge of applications in the second landscape, which might not be allowed or desired.

The disadvantages and problems discussed above can be solved using a cross-landscape integration approach described below. The cross-landscape integration approach can provide a solution for integrating a dependent landscape into a DPI protocol execution of a first (e.g., main or primary) landscape (1) without losing DPI protocol optimizations (e.g., from responder group configurations) and (2) without a main DPI service instance requiring detailed knowledge of the second landscape.

For instance, in a main/dependent DPI service instance relationship, both DPI service instances can be configured independently with regards to each instance knowing which responders are in a respective landscape and which responder groups include which applications. The main DPI service instance can be configured to be aware of a dependent DPI service instance and of how many responder groups are used in the dependent instance. However, the main DPI service instance may not be aware of further details about exactly which applications are in which responder groups in the dependent landscape.

The main DPI service instance can, during protocol execution, coordinate with the dependent DPI service instance so that responder groups of the dependent DPI service instance are merged with responder groups of the main DPI service instance. For instance, responder groups of the dependent DPI service instance can be mapped to responder groups of the main DPI service instance based on how many responder groups are in the first landscape and in the second landscape. Different assignment and mapping approaches are discussed in more detail below. For instance, responder group mapping or merging based on application scores can be used.

During execution of the protocol, the main DPI service instance can send a request to the dependent DPI service instructing the dependent DPI service instance to obtain feedback for just a subset of applications or responder groups in the dependent DPI service instance. The dependent DPI service instance can gather feedback from the subset of applications or responder group(s), determine an aggregate status for the subset, and provide the aggregate status for the subset to the main DPI service instance. The main DPI service instance can evaluate feedback received from a current responder group within the first landscape along with the aggregate status for the subset of applications in the second landscape, to determine whether the protocol run should continue. If the protocol run should continue, the main DPI service instance can request feedback from a next responder group in the first landscape and also send a next instruction to the dependent DPI service instance to obtain feedback for a next subset of applications in the second landscape.

By using such a coordinated approach, responders of the dependent DPI service instance can participate in a more strategic position in the protocol with regards to resource-savings and avoiding protocol failure, as compared to other approaches such as a veto-service approach, without the main DPI service instance requiring knowledge about the second landscape other than, for instance, a number of responder groups used in the second landscape. For example, the main DPI service instance need not know which and how many applications are in the second landscape, how the applications are configured, what technical capabilities the applications have, etc.

The cross-landscape integration approach can be used to handle integration of disparate landscapes that are physically remote from each other, such as landscapes that are each managed by separate and different data centers. However, in some cases, a same data center may be used to manage different landscape of different legal entities. Each different entity may be configured as a separate tenant, for instance. For instance, a main DPI service instance and a dependent DPI service instance may each be configured as different service instance tenants of a same kernel DPI service running in the datacenter. In such configurations, other optimizations may be performed to leverage the existence of the different tenants being in a same datacenter. For example, a common core component and a common core storage area of the kernel service can be used to manage cross-tenant integration, which can result in reduction of data transfer and storage overhead.

Accordingly, an appropriate approach for resource reduction and protocol execution success can be used depending on an implementation choice for multiple-landscape scenarios. If the different landscapes are serviced by different datacenters, the cross-landscape integration and coordination approach described above can be used. If the different landscapes are implemented by using a single datacenter, then a cross-tenant approach can be used. Additionally, other kernel services other than DPI service can leverage the cross-tenant approach. For instance, Master Data Integration (MDI) services can leverage the cross-tenant kernel services optimizations described herein. Other details of MDI are described in in U.S. patent application Ser. No. 17/457,827, filed on Dec. 6, 2021 entitled "REDISTRIBUTING AN OBJECT IN AN INTEGRATED END-OF-PURPOSE PROTOCOL", the contents of which are hereby incorporated by reference. Both the cross-landscape integration approach and the cross-tenant integration approach are described in more detail below.

FIG. 1 is a block diagram illustrating an example system 100 for integrated data privacy services. Specifically, the illustrated system 100 includes or is communicably coupled with a server 102, an end-user client device 104, an administrator client device 105, and landscape systems 106 in a first landscape 107, a second (e.g., "other") landscape 108, and a network 109. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. The landscape systems 106 can each be separate systems or applications that are configured and used in the first landscape 107. As used herein, "system" and "application" are treated as synonymous with respect to being participants of DPI protocols.

With regards to the first landscape 107, the landscape systems 106 can include multiple systems that exist in a multi-system landscape. An organization can use different systems, of different types, to run the organization, for example. The landscape systems 106 can include systems from a same vendor or different vendors. The landscape systems 106 can each include at least one application 110 for performing organizational processes and working with organizational data. Organizational data can include master data objects and transactional objects. For example, the application 110 can process a master data object 112. An end user can use a client application 113 (which may be a client version of the application 110) on the end-user client device 104 to view and interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data across the landscape systems 106 so that each application 110 can perform processing on the same consistent master data.

Various data protection rules and laws may require that data is only processed for legitimate specified purposes. The system 100 can implement a purpose requirement by associating purpose information with each object instance. For example, a purpose 116 has been associated with the master data object 112. A purpose determiner 118 included in a DPI service 120 can determine appropriate purposes for an object and associate the purposes with the object. The landscape system 106 can receive the master data object 112 and the associated purpose 116 from the replication engine 114, for example. The purpose determiner 118 can also determine which applications process objects for which purposes. The replication engine 114 can replicate an object with an assigned purpose to a given landscape system 106 when the landscape system 106 processes objects for that purpose.

Objects that no longer have any associated purposes can be put into a blocked state for a period of time, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 106 can disassociate a purpose with an object in response to information received from an aligned purpose disassociation engine 122 of the DPI service 120, rather than solely based on a local decision. For example, each landscape system 106 can provide information to the aligned purpose disassociation engine 122. For example, a local purpose component 124 in each landscape system 106 can determine locally (e.g., without consulting other systems), for each purpose of an object, whether the purpose can be locally disassociated from the object. For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object when no purposes are associated with the object, no transactional data references the object, and no retention policy currently applies to the object. In response to an object destruction decision, the object blocker/destroyer 121 can destroy the object.

In some implementations, an iEoP (Integrated End of Purpose) engine 130 of the DPI service 120 is used instead of or in addition to the APD engine 122. The iEoP engine 130 can send EoP queries to each landscape system 106 and receive EoP statuses 132 from the local purpose components 124 of different landscape systems regarding ability to delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored about the data subject. The data subject can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 120. Accordingly, any application within the landscape that is integrated with the DPI service 120 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 120 can include or provide other data privacy integration services.

A work package engine 142 can be used to split requests into multiple work packages. As mentioned above, the DPI service 120 can send requests (e.g., work packages) to applications according to responder group configurations 144, to optimize protocol execution with regards to reducing resource consumption, reducing likelihood of protocol failure, etc. Other optimizations can be performed. For instance, a cross-landscape integration engine 146 can be used to integrate a protocol run started by the DPI service 120 with a DPI service 147 in the second landscape 108.

For example, the DPI service 120 can send work packages to landscape systems in a first responder group in the first landscape 107, according to the responder group configurations 144. The responder group configurations 144 can also include information that indicates a count of responder groups in the second landscape 108 (e.g., without revealing other details about responder groups and applications/systems in the second landscape 108). The cross-landscape integration engine 146 can determine a subset of the responder groups (or another grouping of systems/applications in the second landscape 108) that is to receive a protocol request in parallel with the first responder group in the first landscape 107. As described in more detail below, the subset can be based on a mapping of responder group numbers in the first landscape 107 to one or more responder group numbers in the second landscape 108, application score ranges, or other subset-determination approaches.

The DPI service 120 (or, more particularly and as another example, the cross-landscape integration engine 146) can send an instruction to the DPI service 147 in the second landscape instructing the DPI service 147 to send a protocol command to a first subset of systems/applications in the second landscape 108. The DPI service 120 can be considered as a primary DPI service and the DPI service 147 can be considered as a dependent DPI service in this example. The instruction from the DPI service 120 can identify the first subset in various ways (e.g., the instruction can identify a responder group mapping, specific responder groups (e.g. by responder group number) in the second landscape 108, an application or responder group score range, etc.), as described below.

The DPI service 120 can receive responses to the protocol command from the first responder group in the first landscape 107. The DPI service 120 can also receive an aggregate status from the DPI service 147 that aggregates responses to the protocol command received by the DPI service 147 from the first subset of systems/applications in the second landscape 108. The DPI service 120 can determine whether to send the protocol command to a second responder group in the first landscape 107 based on both the responses received from the first responder group and the aggregate status for the first subset received from the DPI service 147. That is, the DPI service 120 can determine whether to continue the protocol run. If the DPI service 120 determines to continue the protocol run, the DPI service 120 can send the protocol command to the second responder group in the first landscape 107 and also send an instruction to the DPI service 147 that instructs the DPI service 147 to send the protocol command to a second subset of systems/applications in the second landscape 108. Further coordination between the DPI service 120 and the DPI service 147 can be performed, until a protocol result is obtained.

The first landscape 107 and the second landscape 108 may include data and processing components in different physical datacenters, for example. As such, processing by the cross-landscape integration engine 146 may be most appropriate in such an example. In other configurations, the DPI service 120 is a kernel service that can spawn different kernel service instances, where each separate kernel service instance can act on data for a different tenant in a same datacenter. For instance, memory 158 can include tenant data 158*a* which may include DPI and/or other data for a first tenant. The memory 158 can also include tenant data 158*b*, tenant data 158*c*, etc., that each include data for other tenants. Each tenant may correspond to a separate legal entity for which data storage, processing, control, and protection is performed. With respect to protocols such as DPI, MDI, etc., each tenant data portion of the memory 158 may include data that represents different multiple-application/multiple-system landscapes. For instance, the tenant data 158*a* may include data for a first application landscape corresponding to a first entity. The tenant data 158*b* and the tenant data 158*c* may each include data for other application landscapes for other entities, respectively. When the memory 158 includes data for different tenants and when the DPI service 120 has different runtime service instances, the DPI service 120 can include a cross-tenant integration engine 148 that can perform optimizations that take advantage of same datacenter processing and storage. For instance, the cross-tenant integration engine 148 can initiate and coordinate parallel DPI processing runs in different DPI service instances that each act on different tenant data portions. While each tenant data portion can include data specific to protocol execution by a different DPI service instance, each DPI service instance can access and use common data in a common storage area 149 for data that can be shared across tenants during parallel protocol executions by the different DPI service instances. Additionally, although cross-tenant DPI service execution is described, similar cross-tenant optimizations can be performed for other kernel services, such as by or for the replication engine 114, e.g., for MDI protocols. Additional details, options, and advantages of cross-tenant and cross-landscape integration are described below.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end-user client device 104, the landscape system 106, and the administrator client device 105, respectively, for communicating with other systems in a distributed environment—including within the system 100—connected to the network 109. Generally, the interfaces 150, 152, 153, and 154 each comprise logic encoded in software and/or hardware in a suitable combination and operable to communicate with the network 109. More specifically, the interfaces 150, 152, 153, and 154 may each comprise software supporting one or more communication protocols associated with communications such that the network 109 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example. Similarly, each landscape system 106 includes one or more processors 157. Each processor 157. Each processor 157 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP 00 (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 159. The memory 159 may store various objects or data associated with the purposes of the landscape system 106.

The end-user client device 104 and the administrator client device 105 may each be any computing device operable to connect to or communicate in the network(s) 109 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 163 or a GUI 164, respectively.

The GUI 163 and the GUI 164 each interface with at least a portion of the system 100 for any suitable purpose, including generating a visual representation of the client application 113 or the administrative application 133, respectively. In particular, the GUI 163 and the GUI 164 may each be used to view and navigate various Web pages. Generally, the GUI 163 and the GUI 164 each provide the user with an efficient and user-friendly presentation of business data provided by or communicated within the system. The GUI 163 and the GUI 164 may each comprise a plurality of customizable frames or views having interactive fields, pull-down lists, and buttons operated by the user. The GUI 163 and the GUI 164 each contemplate any suitable graphical user interface, such as a combination of a generic web browser, intelligent engine, and command line interface (CLI) that processes information and efficiently presents the results to the user visually.

Memory 174 and memory 176 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 174 and the memory 176 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 109. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
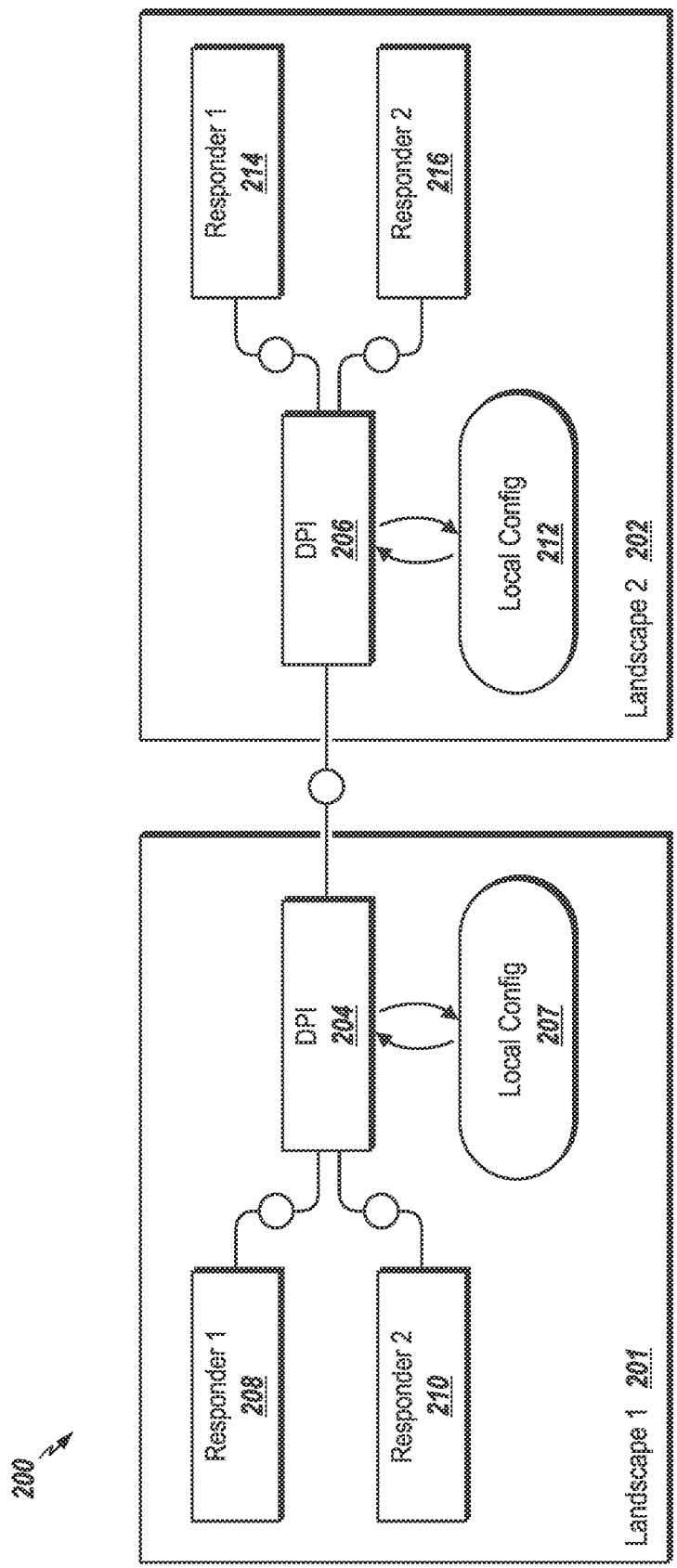
FIG. 2 is a block diagram of an example system that includes multiple application landscapes.

FIG. 2 is a block diagram of an example system 200 that includes multiple application landscapes. For example, the system 200 includes a first landscape 201 and a second landscape 202. The first landscape 201 and the second landscape 202 may each be configured for separate entities (e.g., separate legal entities, such as for different corporate sub-entities, for different regions or countries, etc.).

The first landscape 201 and the second landscape 202 include a DPI service 204 or a DPI service 206, respectively. The DPI service 204 and the DPI service 206 can each operate independently of one another in a respective landscape. For example, the DPI service 204 can run different DPI protocols based on local configuration data 207 by sending requests to and receiving responses from a first responder 208 and a second responder 210 (and possibly other responders). Similarly, the DPI service 206 can run different DPI protocols based on local configuration data 212 by sending requests to and receiving responses from a first responder 214 and a second responder 216 (and possibly other responders). Although each DPI service can run independently, in some cases, a need may arise to integrate different DPI instances in different landscapes, as described above. Accordingly, the solutions described herein can be used to integrate the DPI service 204 with the DPI service 206. For example, a DPI protocol execution managed by the DPI service 206 can be integrated into a DPI protocol execution of the DPI service 204 without losing DPI protocol optimizations such as responder group configurations that may be configured in each landscape. Further, DPI protocol integration can occur without the DPI service 204 knowing detailed internal knowledge of the second landscape 202. As described below, the DPI service 204 can know, for instance, how many responder groups are configured in the second landscape 202, but the DPI service 204 does not need to know which applications are included in which responder groups in the second landscape 202, how many applications are included in the second landscape 202, etc.

Figure 3:
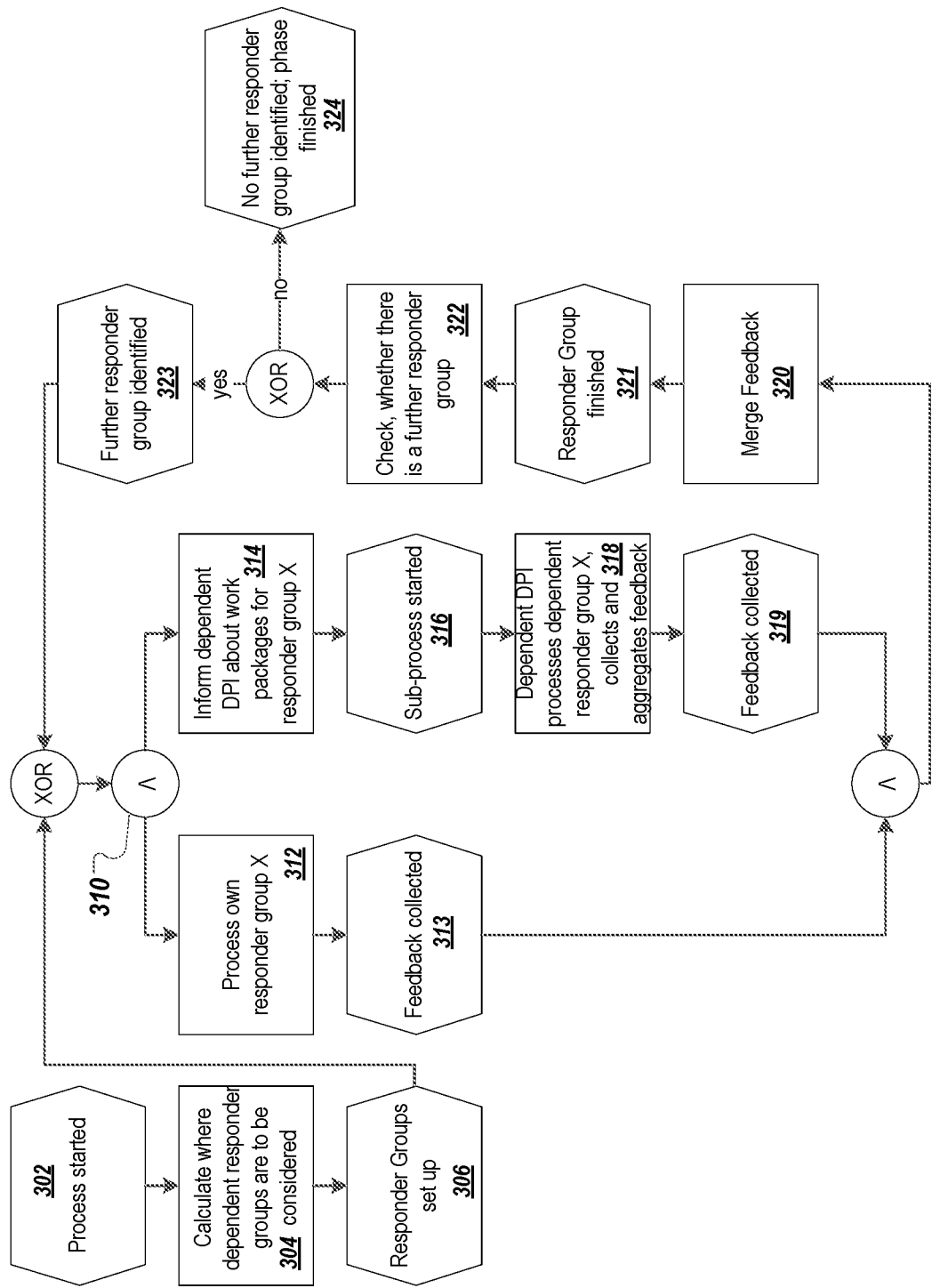
FIG. 3 is a flowchart of an example method for integrating data privacy integration protocols across system landscapes.

FIG. 3 is a flowchart of an example method 300 for integrating data privacy integration protocols across system landscapes.

A start-process event 302 can be detected or received, for example in a main DPI service. For example, the main DPI service can receive a ticket request for a DPI protocol.

At 304, the main DPI service calculates where responder groups of a dependent DPI service are to be considered (e.g., evaluated) with respect to responder groups of the main DPI service. For instance, a dependent responder group assignment can be configured based on responder groups of the main DPI service. The dependent responder group assignment can determined based on the following formula, for example:

$$\text{ROUND}(\text{responder\_group\_dependent}/\text{amount\_of\_responder\_groups\_dependent} * \text{amount\_of\_responder\_groups\_main})$$

where responder_group_dependent is an integer identification of a particular responder group in the dependent DPI instance, amount_of_responder_groups_dependent is a total number of responder groups in the dependent DPI instance, and amount_of_responder_groups_main is a total number of responder groups in the main DPI instance. With this formula, responder groups are identified using integers that are in an ordered sequence (e.g., identifiers of 1, 2, 3, 4, 5, etc.). Other approaches are possible. As an example using this formula, suppose that the main DPI instance has ten responder groups and that the dependent DPI instance has twenty responder groups. A responder group in the main DPI instance that the first responder group in the dependent DPI instance (e.g., responder group "1") is to be grouped/merged with can be determined by calculating:

$$\text{ROUND}\left(\frac{1}{20} * 10\right) = \text{ROUND}(0.05 * 10) = \text{ROUND}(0.5) = 1.$$

Similarly, a responder group in the main DPI instance that the second responder group in the dependent DPI instance (e.g., responder group "2") is to be grouped/merged with can be determined by calculating:

$$\text{ROUND}\left(\frac{2}{20} * 10\right) = \text{ROUND}(0.1 * 10) = \text{ROUND}(1) = 1.$$

That is, in this example, the first and second responder groups of the dependent DPI instance can be calculating: merged with the first responder group of the main DPI instance. Different rounding approaches can be used, such as using a ceiling, floor, or other approaches.

Other approaches for determining the dependent responder group assignment can be used. For example, instead of assigning an integer to every responder group, an approach can be used to assign a float value between 0 and 1 to each responder group, so that the assignment of dependent responder groups to main responder groups may be more refined than with the use of integer responder groups. Such an approach can enable a more-refined determination of an order in which responders are asked to work on a work package, such as when an effort for working on a work package or potential consequences of work packages might not be equally distributed in different landscapes. Float values can be assigned to responder groups or to applications, such as using application scores. Application scores and floating-value based assignment is described in more detail below with respect to FIG. 5. After responder group assignments are complete, a state 306 of responder groups being set up is achieved.

A "^" symbol 310 indicates parallel processing of a first processing block at 312 and a second processing block at 314. For example, at 312, the main DPI service processes a given responder group X (e.g., where X can first be 1, then 2, etc. as iterations progress). Processing the responder group X by the main DPI service can include sending protocol requests to applications in the responder group X, receiving responses from the applications in the responder group X, and evaluating the responses. An event 313 represents feedback from the responder group X of the main DPI service being collected.

At 314, the main DPI service informs a dependent DPI service about work packages for responder group(s) in the dependent DPI service. For instance, the main DPI service informs the dependent DPI service about a subset of responder groups in the landscape of the dependent DPI instance that are relevant to current iteration.

An event 316 represents the starting of a sub-process in the dependent DPI service. For example, the dependent DPI service can process the requested subset of responder group (s) within the landscape of the dependent DPI service in a manner similar to the processing by the main DPI service of the responder group X in the landscape of the main DPI service. At 318, for example, the dependent DPI service collects responses from responder group(s) in the subset, determines an aggregate status, and provides the aggregate status as feedback to the main DPI service. An event 319 represents the aggregate status feedback being collected by the main DPI service. At 320, the main DPI service merges the feedback received from the responder group X of the main DPI service and the aggregate status feedback received from the dependent DPI service.

A responder-group-finished state can be reached (e.g., represented by an event 321) after the main DPI service receives responses from both the responder group X and the feedback received from the dependent DPI service If the feedback from the dependent DPI service or a response from an application in the responder group X reflects a veto vote, the run of the DPI protocol can end. At 322, if neither the feedback from the dependent DPI service nor any response from an application in the responder group X reflects a veto vote, a determination can be made as to whether there is at least one unprocessed responder group (e.g., in the landscape of the main DPI service or the dependent DPI service). If there is at least one unprocessed responder group, a next responder group is identified (e.g., as represented by an event 323) and the identified responder group can be processed as described above (e.g., the next responder group can become the next responder group X). If there are no further unprocessed responder groups, a phase-finished state 324 can be reached indicating completion of a current phase of the DPI protocol. A next phase can be started, as appropriate.

Figure 4:
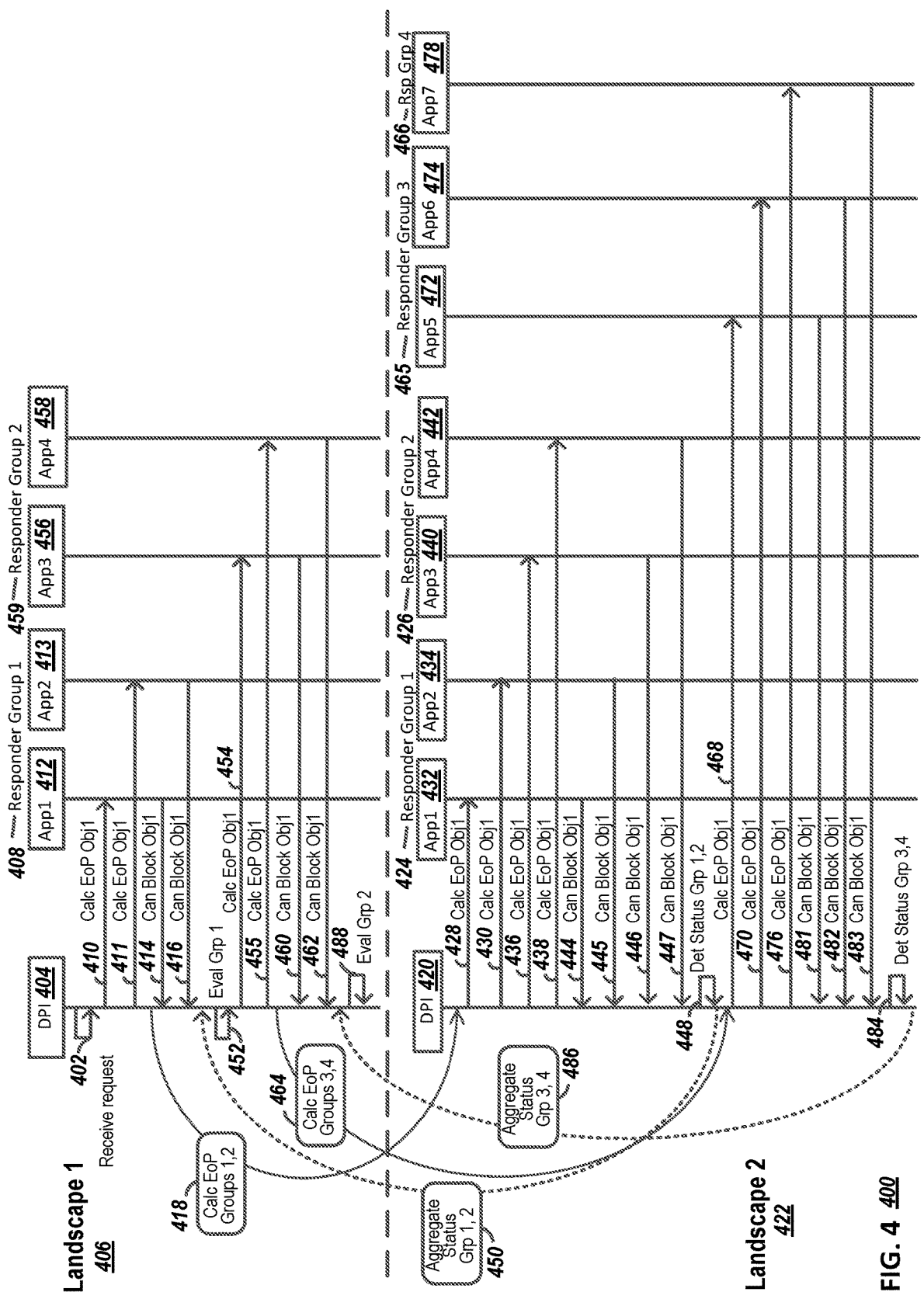
FIG. 4 is a swim lane diagram of an example process for integrating DPI services across application landscapes.

FIG. 4 is a swim lane diagram of an example process 400 for integrating DPI services across application landscapes. At 402, a DPI service 404 in a first landscape 406 receives a ticket request for a DPI protocol (e.g., the iEoP protocol).

The DPI service 404 can determine, based on the received ticket request, to send a request to calculate local end of purpose for an object with an object identifier of "Obj1" to a first responder group 408 in the first landscape 406. Although not shown in FIG. 4, the DPI service 404 can send requests using an event bus and/or by using work packages.

At 410 and 411, the DPI service 404 sends a request to calculate local end of purpose for the Obj1 object to a first application 412 and a second application 413 in the first responder group 408, respectively.

At 414 and 416, the first application 412 and the second application 413, respectively, each send a response to a respective local end of purpose check request indicating that the application is able to block the Obj1 object.

The DPI service 404 can also send a request 418 to a DPI service 420 in a second landscape 422. The request 418 is for the DPI service 420 to send a local end of purpose check request for the Obj1 object to applications in a first responder group 424 and a second responder group 426 that are managed by the DPI service 420 in the second landscape 422. The request 418 can include identifiers (e.g., "1", "2") that identify the first responder group 424 and the second responder group 426. The DPI service 404 can determine a mapping between the first responder group 408 in the first landscape 406 and the first responder group 424 and the second responder group 426 in the second landscape 422, in various ways, as described above, such as based on formula(s) that use integer numbers of the first responder group 408, the first responder group 424, and the second responder group 426, a total number of responder groups in the first landscape 406, and a total number of responder groups in the second landscape 422.

At 428 and 430, the DPI service 420 sends a request to calculate local end of purpose for the Obj1 object to applications in a first application 432 and a second application 434 in the first responder group 424, respectively. Similarly, at 436 and 438, the DPI service 420 sends a request to calculate local end of purpose for the Obj1 object to a third application 440 and a fourth application 442 in the second responder group 426, respectively.

At 444, 445, 446, and 447, the first application 432, the second application 434, the third application 440, and the fourth application 442, respectively, each send a response to a respective local end of purpose check request indicating that the application is able to block the Obj1 object.

At 448, the DPI service 420 determines an aggregate EoP status for the applications in the first responder group 424 and the second responder group 426. For instance, the aggregate status can be that all applications in those two responder groups can block the Obj1 object. The DPI service 420 sends an aggregate status 450 for the first responder group 424 and the second responder group 426 to the DPI service 404.

At 452, the DPI service 404 evaluates responses to local EoP checks received from applications in the first responder group 408 and also the aggregate status 450 received from the DPI service 420. For instance, the aggregate status 450 received from the DPI service 420 and the responses received from applications in the first responder group 408 can each indicate an ability to block the Obj1 object.

At 454 and 455, the DPI service 404 sends a request to calculate local end of purpose for the Obj1 object to a third application 456 and a fourth application 458 in a second responder group 459, respectively. At 460 and 462, the third application 456 and the fourth application 458, respectively, each send a response to a respective local end of purpose check request indicating that the application is able to block the Obj1 object.

The DPI service 404 can also send a request 464 to the DPI service 420. The request 464 is for the DPI service 420 to send a local end of purpose check request for the Obj1 object to applications in a third responder group 465 and a fourth responder group 466 that are managed by the DPI service 420 in the second landscape 422. A mapping of responder groups with group numbers "3" and "4" in the second landscape 422 to the responder group with group number "2" in the first landscape 406 can be performed in various ways (e.g., with different formulas, as described above).

At 468 and 470, the DPI service 420 sends a request to calculate local end of purpose for the Obj1 object to a fifth application 472 and a sixth application 474 in the third responder group 465, respectively. Similarly, at 476, the DPI service 420 sends a request to calculate local end of purpose for the Obj1 object to a seventh application 478 in the fourth responder group 466. At 481, 482, and 483, the fifth application 472, the sixth application 474, and the seventh application 478, respectively, each send a response to a respective local end of purpose check request indicating that the application is able to block the Obj1 object.

At 484, the DPI service 420 determines an aggregate EoP status for the applications in the third responder group 465 and the fourth responder group 466. For instance, the aggregate status can be that all applications in those two responder groups can block the Obj1 object. The DPI service 420 sends an aggregate status 486 for the third responder group 465 and the fourth responder group 466 to the DPI service 404.

At 488, the DPI service 404 evaluates responses to local EoP checks received from applications in the second responder group 459 and also the aggregate status 486 received from the DPI service 420. For instance, the aggregate status 486 received from the DPI service 420 and the responses received from applications in the second responder group 459 can each indicate an ability to block the Obj1 object.

In response to the evaluation performed at 488, the DPI service 404 can proceed to a next stage in the DPI protocol. For example, the DPI service 404 can create a block work package and send the block work package to applications in the first landscape 406 and to the DPI service 420 requesting that the DPI service 420 send the block work package to applications in the second landscape 422. Both the first landscape 406 and the second landscape 422 can have different block responder group configurations that group applications differently than the check responder group configurations shown in FIG. 4.

Figure 5:
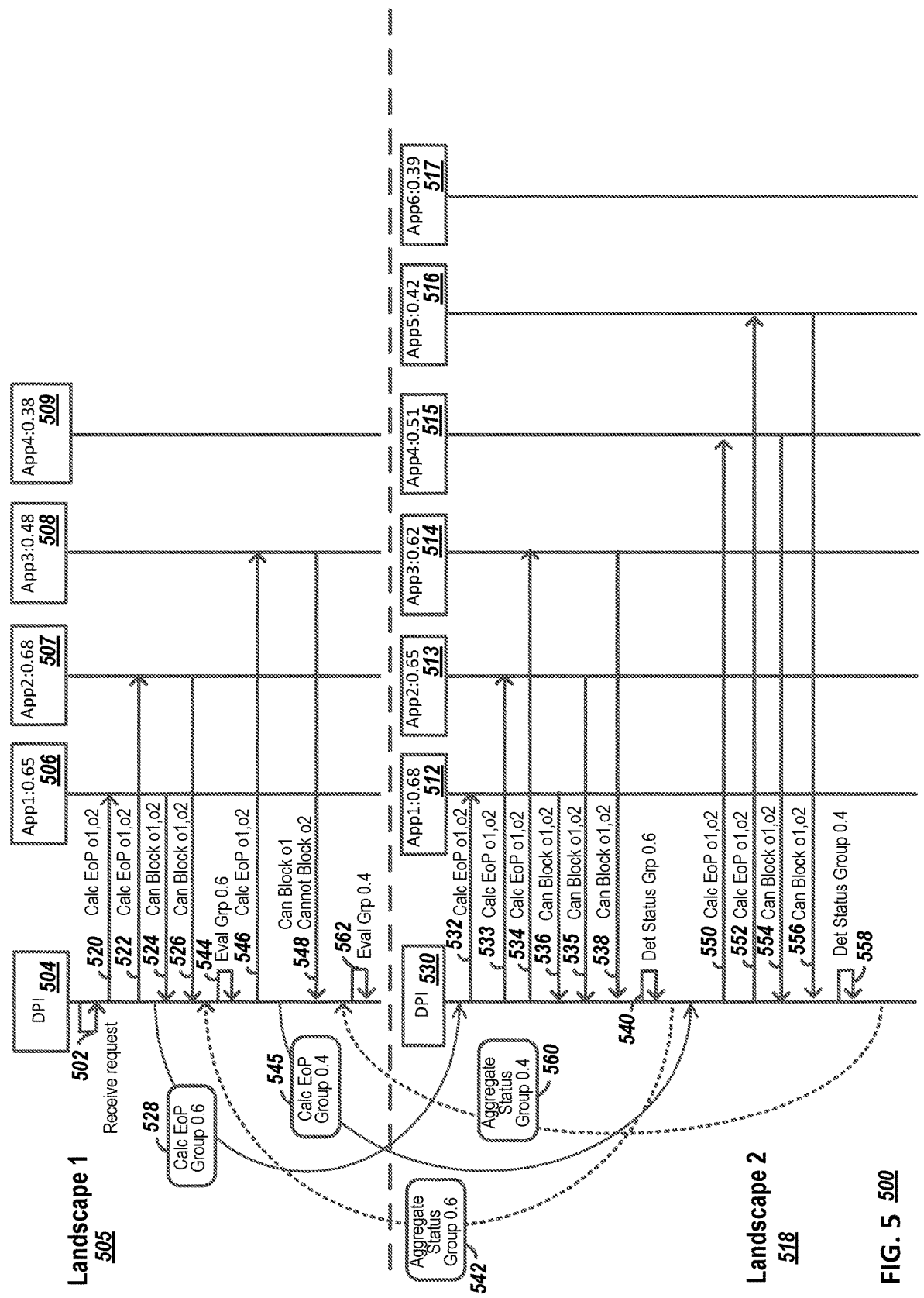
FIG. 5 is a swim lane diagram of an example process for integrating DPI services across application landscapes.

FIG. 5 is a swim lane diagram of an example process 500 for integrating DPI services across application landscapes. At 502, a DPI service 504 in a first landscape 505 receives a ticket request for a DPI protocol (e.g., the iEoP protocol). As compared to the example of FIG. 4, the example of FIG. 5 includes sending protocol requests to applications based on application scores.

An application score can be, for example, a float value between 0 and 1 where a higher application score can mean that an application should be sent a protocol request before applications with lower application scores. For example, an application with a higher application score can be more likely to provide a veto protocol vote (e.g., more likely to respond with cannot-block or cannot-disassociate-purpose) or more likely to fail a protocol operation (e.g., blocking, purpose disassociation, etc.) than an application with a lower application score. As another example, an application with a higher application score can be more likely to expend a lower amount of resources or take a shorter amount of time to process a protocol request or operation than an application with a lower application score. In the first landscape 505, a first application 506, a second application 507, a third application 508, and a fourth application 509 have application scores of 0.65, 0.68, 0.48, and 0.38, respectively.

A first application 512, a second application 513, a third application 514, a fourth application 515, a fifth application 516, and a sixth application 517 in a second landscape 518 have application scores of 0.68, 0.65, 0.62, 0.51, 0.42, and 0.39, respectively.

The DPI service 504 can first determine to send a protocol request to applications having at least a first threshold application score, then secondly determine to send the protocol request to applications having at least a second, lower threshold application score (if no applications have sent a veto vote for the protocol), and then so on for possibly other, lower application score thresholds.

For example, at 520 and 522, the DPI service 504 sends a request to calculate local end of purpose for objects with object identifiers of "o1" or "o2" (e.g., referred to below as the o1 and o2 objects) to the first application 506 and the second application 507, respectively. A first application score threshold can be 0.6, for example, and the applications in the first landscape 505 that have at least the first threshold application score can be referred to as a first group of applications in the first landscape 505 (e.g., first to receive and process a protocol request in the first landscape 505).

At 524 and 526, the first application 506 and the second application 507, respectively, each send a response to a respective local end of purpose check request indicating that the application is able to block the o1 and o2 objects.

The DPI service 504 can also send a request 528 to a DPI service 530 in the second landscape 518. The request 528 is for the DPI service 530 to send a local end of purpose check request for the o1 and o2 objects to applications in the second landscape 518 that have an application score of at least the first application score threshold of 0.6.

In some implementations, each landscape uses a same application score scale where a same application score in one landscape has a same (or substantially similar) meaning with respect to ordering applications by application score as a same application score in another landscape. In other implementations, a receiving DPI service may perform a calculation to adjust an application score threshold received from a sending DPI service to an application score threshold appropriate for the landscape of the receiving DPI service.

In still other implementations, local normalizations of application scores can be performed so that scores of applications in different respective landscapes cover a same range. For instance, suppose a first landscape has three application scores of 0.5, 0.6, and 0.833 and that a second landscape has three application scores of 0.8, 0.9, and 0.1. A first normalization process can be performed on each application score set based on a span of the range of values in the set. For instance, the range of the scores in the first landscape spans 0.333, so the first normalization calculation can include multiplying all score values for the first landscape by a value of (1/span)=(1/0.333)=3, resulting in adjusted scores for the first landscape of 1.5, 1.8, and 2.5 that have an adjusted span of one. The range of the scores in the second landscape spans 0.2, so the first normalization calculation can include multiplying all score values for the second landscape by a value of (1/span)=(1/0.2)=5, resulting in adjusted scores for the first landscape of 4, 4.5, and 5 that also have an adjusted span of one. A second normalization calculation can include further adjusting the adjusted scores so that the lowest scores start at zero. For example, 1.5 can be subtracted from each of the adjusted scores for the first landscape to get final normalized scores of 0, 0.3, and 1.0. Similarly, 2.0 can be subtracted from each of the adjusted scores for the second landscape to get final normalized scores of 0, 0.5, and 1.0.

Normalization of scores can result in equal treatment of different landscapes, even when, for example, administrators of different landscapes use different approaches or have different experience in assigning initial application scores. Additionally, normalization across landscapes can prevent an administrator from artificially assigning scores so as to receive preferential treatment, such as setting scores so that other applications receive requests first and therefore normally expend resources instead of or at least before applications in the landscape of the administrator. In cases where application scores are algorithmically determined (as described below) using a same algorithm across landscapes, normalization may be omitted.

Referring again to FIGS. 5, at 532, 533, and 534, in response to the request 528, the DPI service 530 sends a request to calculate local end of purpose for the o1 and o2 objects to the first application 512, the second application 513, and the third application 514, respectively. The applications in the second landscape 518 that have at least the first threshold application score can be referred to as a first group of applications in the second landscape 518 (e.g., first to receive and process a protocol request in the second landscape 518).

At 536, 535, and 538, the first application 512, the second application 513, and the third application 514, respectively, each send a response to a respective local end of purpose check request indicating that the application is able to block the o1 and o2 objects.

At 540, the DPI service 530 determines an aggregate EoP status for the first group of applications in the second landscape 518 (e.g., the applications in the second landscape that have an application score of at least the first application score threshold of 0.6). For instance, the aggregate status for the first group of applications in the second landscape 518 can be that all such applications can block the o1 and o2 objects. The DPI service 530 sends an aggregate status 542 to the DPI service 504 for the first group of applications in the second landscape 518.

At 544, the DPI service 504 evaluates responses to local EoP checks received from the first group of applications in the first landscape 505 and also the aggregate status 542 received from the DPI service 530. For instance, the aggregate status 542 received from the DPI service 530 and the responses received from the first group of applications in the first landscape 505 can each indicate an ability to block the o1 and o2 objects.

At 546, the DPI service 504 sends a request to calculate local end of purpose for the o1 and o2 objects to the third application 508. A second application score threshold can be 0.4, for example, and the applications in the first landscape 505 that have not yet received the EoP check request and that have at least the second threshold application score can be referred to as a second group of application(s) in the first landscape 505 (e.g., second to receive and process a protocol request).

The DPI service 504 can also send a request 545 to the DPI service 530. The request 545 is for the DPI service 530 to send a local end of purpose check request for the o1 and o2 objects to applications in the second landscape 518 that have not yet received the EoP check request and that have an application score of at least the second application score threshold of 0.4.

At 548, the third application 508 sends a response to a received local end of purpose check request indicating that the third application 508 is able to block the o1 object but is not able to block the o2 object.

At 550 and 552, in response to the request 546, the DPI service 530 sends a request to calculate local end of purpose for the o1 and o2 objects to the fourth application 515 and the fifth application 516, respectively. The applications in the second landscape 518 that have not previously received the protocol request and that have at least the second threshold application score can be referred to as a second group of applications in the second landscape 518 (e.g., second to receive and process a protocol request).

At 554 and 556, the fourth application 515 and the fifth application 516, respectively, each send a response to a respective local end of purpose check request indicating that the application is able to block the o1 and o2 objects.

At 558, the DPI service 530 determines an aggregate EoP status for the second group of applications in the second landscape 518. For instance, the aggregate status for the second group of applications in the second landscape 518 can be that all such applications can block the o1 and o2 objects. The DPI service 530 sends an aggregate status 560 to the DPI service 504 for the second group of applications in the second landscape 518.

At 562, the DPI service 504 evaluates responses to local EoP checks received from the second group of applications in the first landscape 505 and also the aggregate status 560 received from the DPI service 530. Part of the evaluation at 562 can include determining that all applications that have thus far received an EoP check request for the o1 object have responded as being able to block the o1 object. However, the DPI service 504 can determine, based on received feedback from the third application 508, that the third application 508 cannot block the o2 object. Accordingly, a protocol result for the o2 object can be reached (e.g., that not all applications can block the o2 object). For the o1, object, however, the DPI service 504 can continue to send EoP check requests to other applications in the first landscape 505 (e.g., the fourth application 509) that have not yet received an EoP check request for the o1 object. Additionally, the DPI service 504 can continue to send requests for the o1 object to the DPI service 530 (which can ultimately result in the sixth application 517 receiving an EoP check request for the o1 object).

The process 500 shows applications not assigned to responder groups. However, responder groups can also be used in the first landscape 505 and/or the second landscape 518. Rather than assign an application score to a particular application, a floating value can be assigned to a responder group. In some implementations, a one-application-per-responder-group assignment can be made. In general, application scores or other scores (e.g., floating values) assigned to responder groups can be used to define a relative order in which applications are to respond to protocol requests.

Other options or alternatives are possible. For example, in some implementations, a main DPI instance may use different floating values for different landscapes. For example, the main DPI instance might apply for its own landscape a float value of 0.6 for an application score threshold, but for a dependent landscape a float value of 0.5 might be used for the application score threshold. The main DPI instance might use different application score thresholds for different landscapes, for example, in response to the main DPI instance learning (e.g., from logged statistics from earlier protocol executions) that a certain probability to raise a veto vote for the applications in the main landscape corresponds to an application score threshold of 0.6 whereas the same probability corresponds to an application score threshold of 0.5 for responders in the dependent landscape.

Other alternatives include a second landscape that is dependent to a first landscape also being a main landscape for a third landscape that is a dependent landscape to the second landscape. In such examples, the second landscape might integrate the third landscape into a protocol run while the first landscapes integrates the second landscape into a protocol run. The second landscape could use the same rules and/or thresholds. For instance, when the second landscape receives an instruction to execute a protocol process for responders with application scores greater than 0.6, the second landscape can instruct the third landscape to execute the same protocol process for the responders of the third landscape that have application scores greater than 0.6. Or, as described above, different application score thresholds may be used for the second and third landscapes. As yet another example, the second landscape may use other integration mechanism(s). For instance, the second landscape might use a veto-service based approach or a representer-based approach (e.g., despite respective disadvantages of both approaches), or integrate the third landscape in some other way. In some cases, a main (e.g., first) landscape might integrate with a second and a third landscape that are both independent from each other but that are both dependent landscapes to the first landscape.

In some cases, an application or responder group score is determined based on a formula. The formula can be based on different factors. Factors can include, for example: 1) an estimate time and/or cost to perform a protocol request; 2) a probability of providing a veto vote (e.g., cannot block, cannot disassociate purpose; 3) communication overhead (e.g., different responder group frameworks may involve different communication overheads); 4) probability of failing a requested operation (e.g., failing to successfully block an object, failing to disassociate a purpose from an object, failing); and 5) probability to not respond before a timeout occurs (e.g., when performing a protocol operation, such as blocking objects, disassociating purposes from objects, gathering personal data for a data subject, etc.). Other factors can be included. Factors used to determine an application or responder group score for a given protocol phase can depend on the protocol phase, the size of a work package, a specific protocol command or request, etc. Initially, some values that are used for an application for factors for determining an application or responder group score can be estimations manually configured by an administrator. Over time, values for applications can be determined based on historical application participation in DPI protocols. In some cases, a machine learning network or other artificial intelligence approach can be used to assign and/or adjust application scores.

As described, application scores can be floating point values between zero and one. In some cases, applications with application scores closer to one are applications that should be asked to respond earlier to protocol requests whereas in other cases applications with application scores closer to zero are applications that should be asked to respond earlier to protocol requests.

In some implementations, floating-value application scores can be used in a single DPI service scenario, rather than integer-based responder groups as described in the incorporated by reference U.S. patent application Ser. No.

17/718,770. For example, rather than requesting applications in a particular responder group N to respond to a request, the DPI service may first ask all applications with an application score within a first application score range such as [0.8, 1.0] to respond, and then next ask all applications with an application score within a second application score range such as [0.6, 0.8) to respond, etc.

Figure 6:
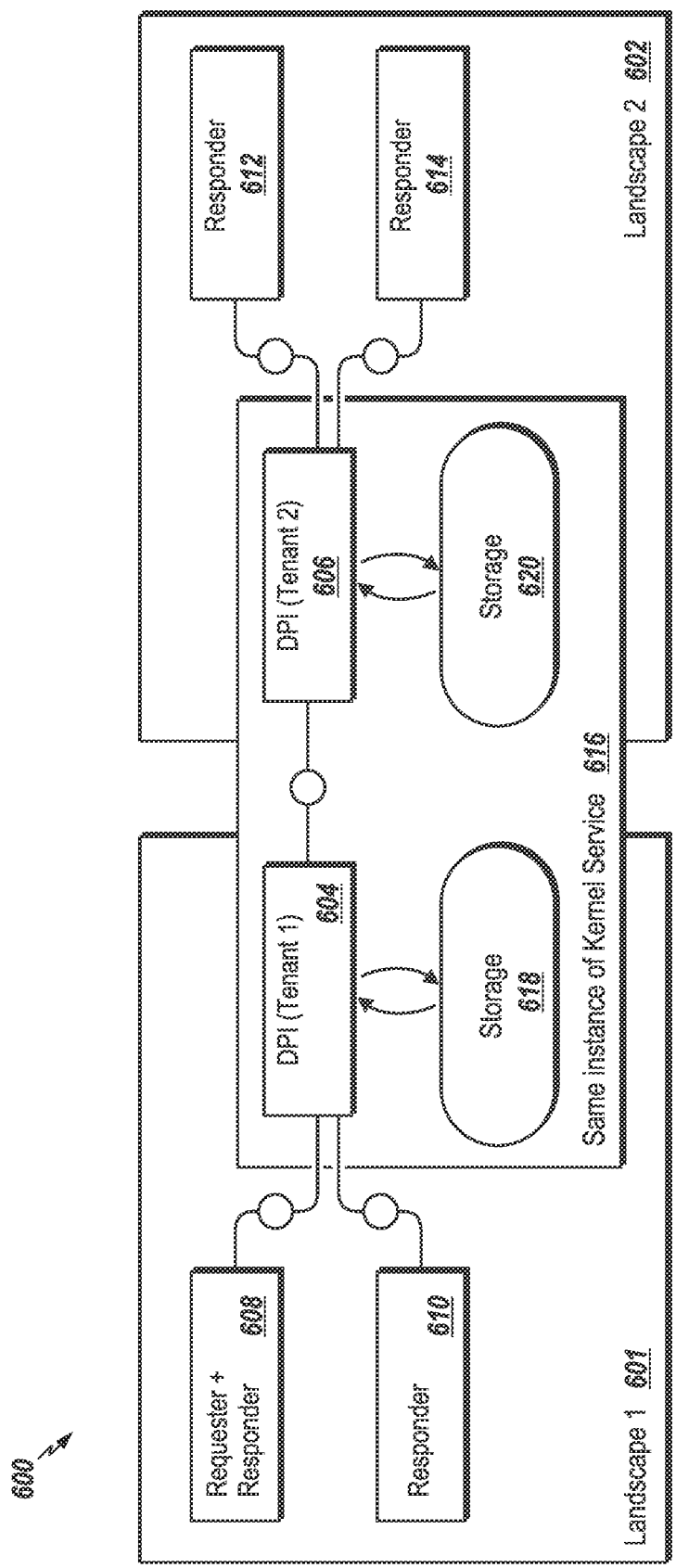
FIG. 6 is a block diagram of an example system that includes multiple application landscapes.

FIG. 6 is a block diagram of an example system 600 that includes multiple application landscapes. The system 600 is similar to the system 200 described above. For example, the system 600 includes a first landscape 601 and a second landscape 602. The first landscape 601 and the second landscape 602 may each be configured for separate entities.

The first landscape 601 and the second landscape 602 include either a first DPI service 604 or a second DPI service 606, respectively. The first DPI service 604 manages DPI protocols for the first landscape for a requester/responder 608, a responder 610, and other responders. The second DPI service 606 for the second landscape 602 can be integrated into protocol runs of the first DPI service 604, as described above, by including and aggregating responses from responders 612 and 614.

In some implementations, the first DPI service 604 and the second DPI service 606 are first and second tenants, respectively, of a same instance 616 of a kernel service. The first DPI service 604 (e.g., the first tenant) can have storage 618 that is separate from storage 620 for the second DPI service 606 (e.g., the second tenant). The storage 618 and the storage 620 can exist in, and the two DPI services can run in, a same data center. In such examples, although the approach described above can be used of the first DPI service 604 integrating with the second DPI service 606 by having the second DPI service 606 send requests to certain responder groups, other optimizations can be performed instead to take advantage of both DPI services running in a same data center.

Figure 7:
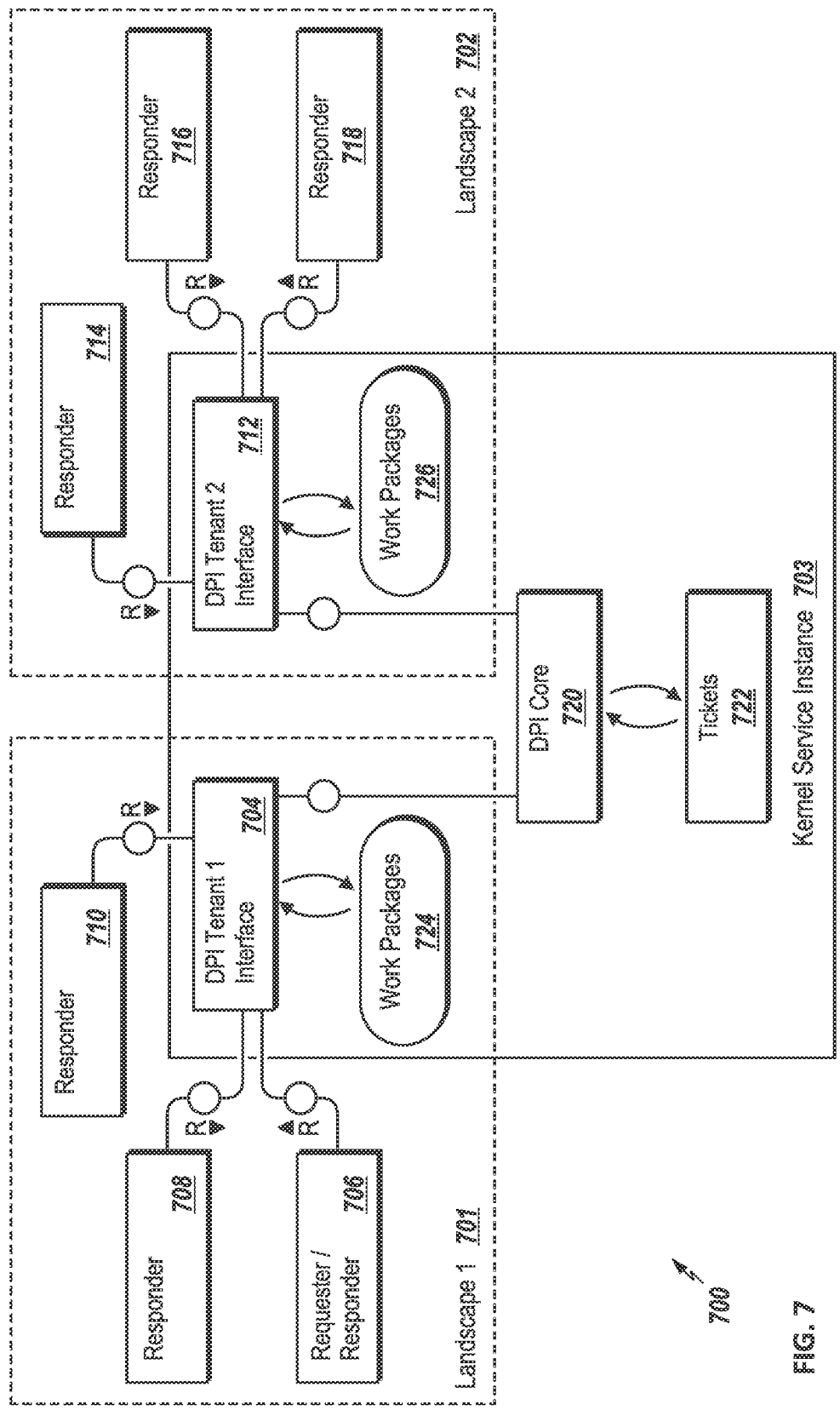
FIG. 7 is a block diagram of an example system for cross-tenant kernel services for data privacy integration protocols.

FIG. 7 is a block diagram of an example system 700 for cross-tenant kernel services for data privacy integration protocols. Similar to FIG. 2 described above, the system 700 includes a first landscape 701 and a second landscape 702 that are both serviced by a same data center, for example. A kernel service instance 703 has a first DPI tenant 704 as a first DPI service managing DPI protocols for a requester/responder 706 and responders 708 and 710 in the first landscape 701. The kernel service instance 703 also has a second DPI tenant 712 as a second DPI service managing DPI protocols for responders 714, 716, and 718 in the second landscape 702. Although not shown, the second landscape 702 can include an application acting in a requester role, so that the second DPI tenant 712 can work on tickets in the first landscape 701 independent of the first landscape 701.

The system 700 can be configured such that the second DPI tenant 712 is to participate in DPI protocol(s) managed by the first DPI tenant 704. A DPI core component 720 and a common tickets area 722 can be used to take advantage of both landscapes being serviced by a same data center. For example, the requester/responder 706 can send the ticket creation request to the first DPI tenant 704. The first DPI tenant 704 can send the ticket to the DPI core component 720. The DPI core component 720 can store ticket information in the tickets area 722 as part of moving data within the same kernel service instance 703 (e.g., rather than sending ticket information to the second DPI tenant 712 over a network). The tickets area 722 (or another storage area) can include configuration information that indicates which DPI tenants are to participate in which tickets. For example, the configuration information can specify that the second DPI tenant 712 is dependent on the first DPI tenant 704 and that a ticket created in the first landscape 701 can be worked on by the second DPI tenant 712 as well as the first DPI tenant 704.

Both the first DPI tenant 704 and the second DPI tenant 712 can send a request to the DPI core component 720 for information in the tickets area 722 that is relevant to a given tenant. The tickets area 722 can store, for a ticket, object identifiers associated with the ticket along with other metadata such as minimal remaining processing time information (if applicable). Using a common tickets area 722 can save storage as compared to duplicating ticket information for use by both landscapes.

Although the tickets area 722 can be a shared data area, each of the first DPI tenant 704 and the second DPI tenant 712 can operate independently, in parallel, to process the ticket. For instance, the first DPI tenant 704 and the second DPI tenant 712 can use a separate work packages area 724 or 726, respectively, to store work package information for dividing work for processing the ticket in a respective landscape. Each DPI tenant can create work packages in an appropriate fashion for a respective landscape. For instance, the second DPI tenant 712 may determine that a larger number of smaller work packages are appropriate for the second landscape 702 whereas the first DPI tenant 704 may determine that a few number of larger work packages are appropriate for the first landscape 701. Accordingly, since each DPI tenant makes independent work package decisions, storage and network requirements can be reduced by avoiding a sending of work package information between landscapes.

The first DPI tenant 704 and the second DPI tenant 712 can send work packages to respective applications according to the DPI protocol being executed. Work packages can be processed by respective applications, in parallel, in both landscapes. The first DPI tenant 704 and/or the second DPI tenant 712 may receive a veto vote/response (e.g., cannot-block) from a respective landscape application. A veto vote by any application in the system 700 may be considered as a veto vote for the cross-landscape run of the DPI protocol. If the first DPI tenant 704 or the second DPI tenant 712 receives a veto vote, a message can be sent to the DPI core component 720 so that the DPI core component 720 can notify the other DPI tenant of the veto vote. Accordingly, a DPI protocol run can be halted in both landscapes in response to a veto vote occurring in either landscape. Neither the first DPI tenant 704 nor the second DPI tenant 712 needs to know detailed results about which application in another landscape provided a veto vote. A given DPI tenant can simply be notified that some veto vote occurred. Accordingly, DPI protocols can be integrated without a need to store tickets multiple times and without a need to send work packages through a network an additional time from one DPI tenant to another DPI tenant.

In some implementations, the requester/responder 706 can include options in the ticket creation request such as a no-optimization flag that can result, such as for right-to-be-forgotten requests, in all responders in each landscape receiving and working on work packages, even if veto votes are provided by one or more responders. As another example, the ticket creation request can have a verbose flag that requests responders to log more verbose log messages, which can further help a data controller to have a detailed knowledge of what has happened for a ticket. However, in a multi-landscape scenario such as shown in FIG. 7, detailed information such as why a veto was raised, which application provided a veto, detailed log messages, etc. does not need to be shared across the landscapes. For example, a data privacy expert for the first landscape 701 might have authorization to see such detailed information for first landscape applications and another data privacy expert (or the same person) might have authorization to see similar detailed information in the second landscape. However, potentially sensitive information does not need to be shared across the landscapes.

Figure 8:
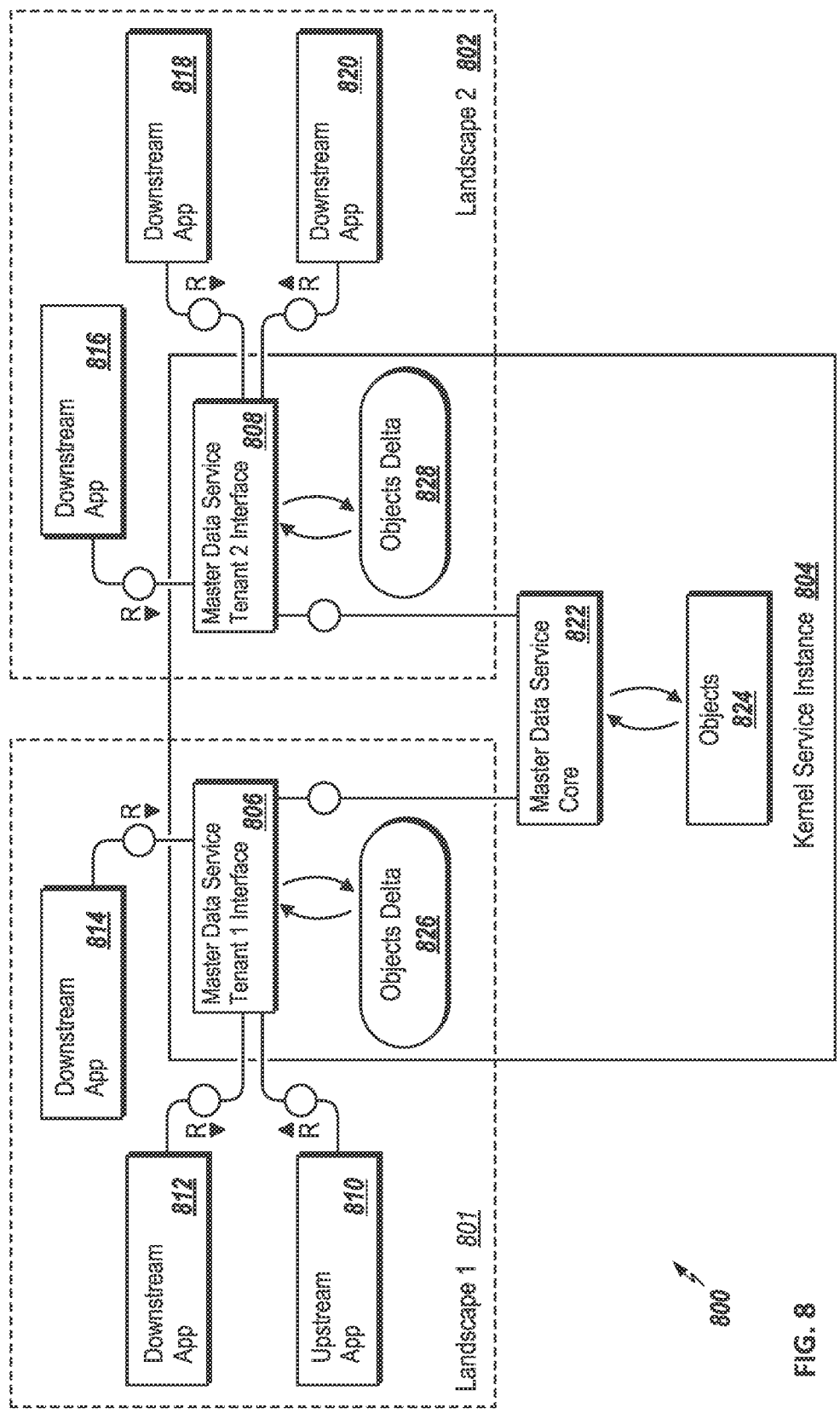
FIG. 8 is a block diagram of an example system for cross-tenant kernel services for master data integration.

FIG. 8 is a block diagram of an example system 800 for cross-tenant kernel services for master data integration. A similar cross-tenant kernel services approach as described above for FIG. 7 can be applied in different contexts, such as a master data integration context. The system 800 includes a first landscape 801 and a second landscape 802 both serviced by a same data center. A same kernel service instance 804 for master data integration has a first master data service tenant 806 and a second master data service tenant 808. The system 800 is configured such that master data is to be replicated from an upstream application 810 in the first landscape 801 to downstream applications 812 and 814 in the first landscape 801 and also to downstream applications 816, 818, and 820 in the second landscape 802. The upstream application 810 and the downstream applications 812 and 814 are integrated with the first master data service tenant 806 and the downstream applications 816, 818, and 820 are integrated with the second master data service tenant 808.

The system 800 can represent a customer scenario in which two entities (e.g. legal entities) each have their own software landscape but are hosted by a same data center and run in a same hosting environment (e.g. both in a same datacenter of a same data center provider). While the customer might want or need to keep applications separate for both entities, there may be a requirement or a desire to replicate data from the first landscape 801 into the second landscape 802. As configured, the second master data service tenant 808 can act as a downstream application towards the first master data service tenant 806 and the first master data service tenant 806 can act as an upstream service towards the second master data service tenant 808.

An approach of replicating data from the first master data service tenant 806 to the second master data service tenant 808 and storing replicated data in the second master data service tenant 808 can have various disadvantages. For example, replicating data between the two tenants can double a storage requirement. Replicating data can involve invoking integration APIs and transferring data over a network, which can consume substantial resources. Additionally, higher costs may be incurred, for example, to a data center provider.

Rather than replication, a cross-tenant kernel service approach can be used that involves a single master data service core component 822 and a common storage area 824. The common storage area 824 can include, for example, objects that are shared between tenants. Both the first master data service tenant 806 and the second master data service tenant 808 can read data for shared objects in the common storage area 824, for example. The common storage area 824 can include not only object data but also metadata which describes which objects are shared with which landscapes, for example.

Each of the first master data service tenant 806 and the second master data service tenant 808 can include an objects delta storage area 826 or 828, respectively, that can be used to store landscape-specific object data, when needed. For instance, in some cases, an object may need to be changed in the second landscape 802 but not in the first landscape 801, or an object may have different or additional attribute values in one landscape as compared to a different landscape. In such cases, an original or base version of an object can be included in the common storage area 824 and delta information for the object can be stored in the objects delta storage area 826 and/or the objects delta storage area 828. Respective delta information can describe modifications to an original or base object to be applied for a particular landscape.

Figure 9:
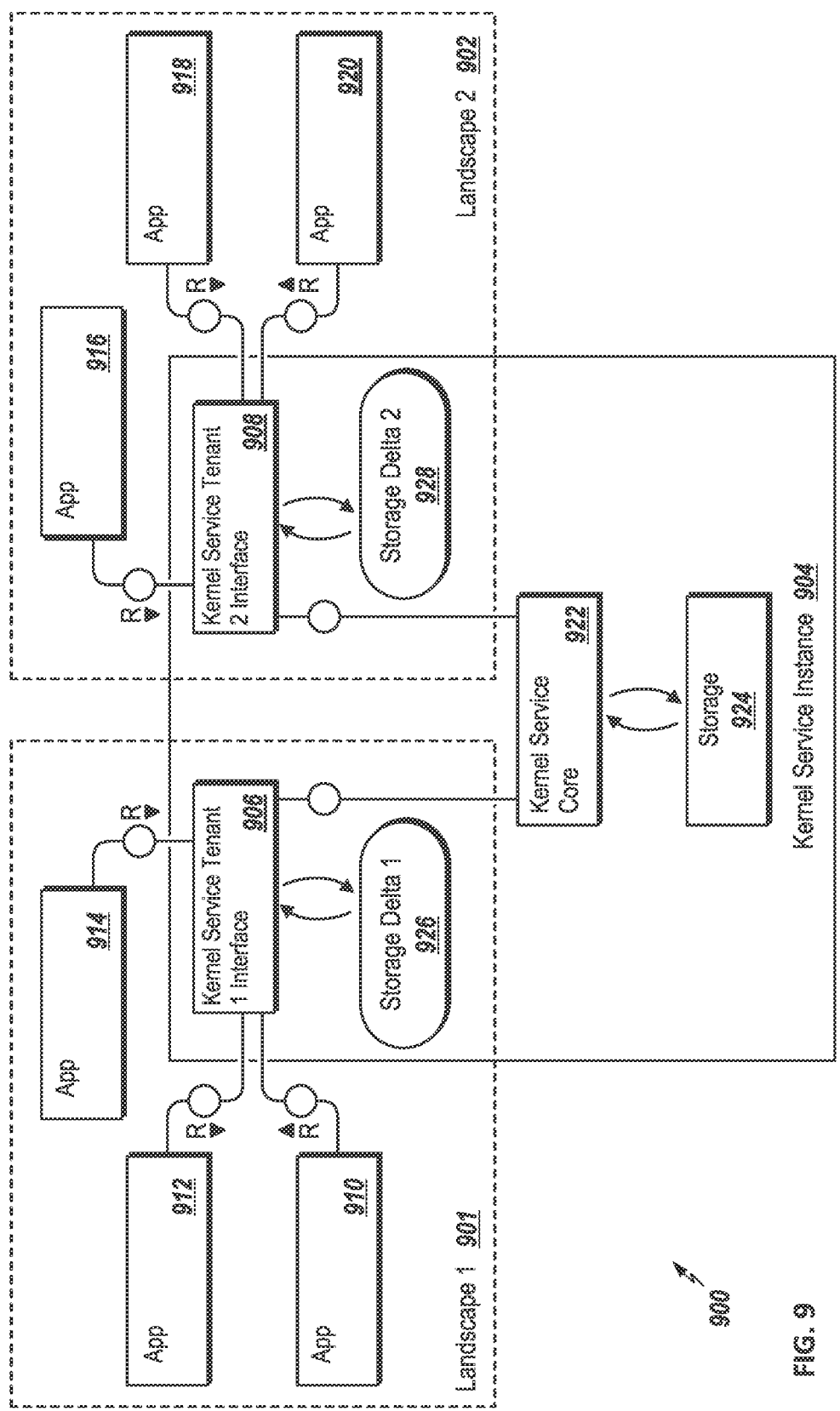
FIG. 9 is a block diagram of an example system for cross-tenant kernel services.

FIG. 9 is a block diagram of an example system 900 for cross-tenant kernel services. The system 900 illustrates a general pattern of using cross-tenant kernel services for integrating different application landscapes. The system 900 includes a first landscape 901 and a second landscape 902 both serviced by a same data center. A same kernel service instance 904 has a first kernel service tenant 906 and a second kernel service tenant 908. The kernel service instance 904 can be a DPI protocol service instance, an MDI service instance, or some other type of service instance made available to applications in the first landscape 901 or the second landscape 902. Applications 910, 912 and 914 are integrated with the first kernel service tenant 906 and applications 916, 918, and 920 are integrated with the second kernel service tenant 908.

A kernel service core component 922 and a core storage area 924 can be used for integrating the second kernel service tenant 908 with the first kernel service tenant 906 to reduce storage and network load requirements while limiting knowledge of one kernel service tenant of internal details regarding the other kernel service tenant. Delta storage areas 926 and 928 can be used for tenant data specific to the first kernel service tenant 906 or the second kernel service tenant 908, respectively.

Various advantages can be realized by using the pattern shown in FIG. 9. For example, use of the core storage area 924 results in reduced space consumption, as compared to data being stored both in a first storage area specific to the first landscape 901 and in a second storage area specific to the second landscape 902. Additionally, network traffic can be reduced because the first kernel service tenant 906 and the second kernel service tenant 908 do not need to send data to each other over a network (e.g., as in the example of FIG. 4, for instance). Also, debugging processes can be simplified, as compared to an integrated example of FIG. 4, since each of the first kernel service tenant 906 and the second kernel service tenant 908 can operate independently and multiple-system integration scenarios need not be debugged (which can be complex in some situations).

In some implementations, the core storage area 924 may include a different portion for different combinations of tenants. For example, in a system with three tenants A, B, and C, the core storage area 924 may include a first portion for the tenants A and B, a second portion for the tenants A and C, and a third portion for the tenants B and C. A common storage portion applicable to all tenants can still be included in the core storage area 924 (for example, the common storage portion can include configuration information that indicates which tenants are relevant for which DPI tickets). For instance, in some implementations, the core storage area can include flags for a data set, so that the kernel service core component 922 knows which of multiple tenants is authorized to see the data set. For example, in a system with a first, second, and third tenant, the core storage area 924 can include flags for a data object indicating that the data object is visible for the first and second tenant (by setting respective flags for the first and second tenant) but not for the third tenant (by not setting a flag for the third tenant).

Figure 10:
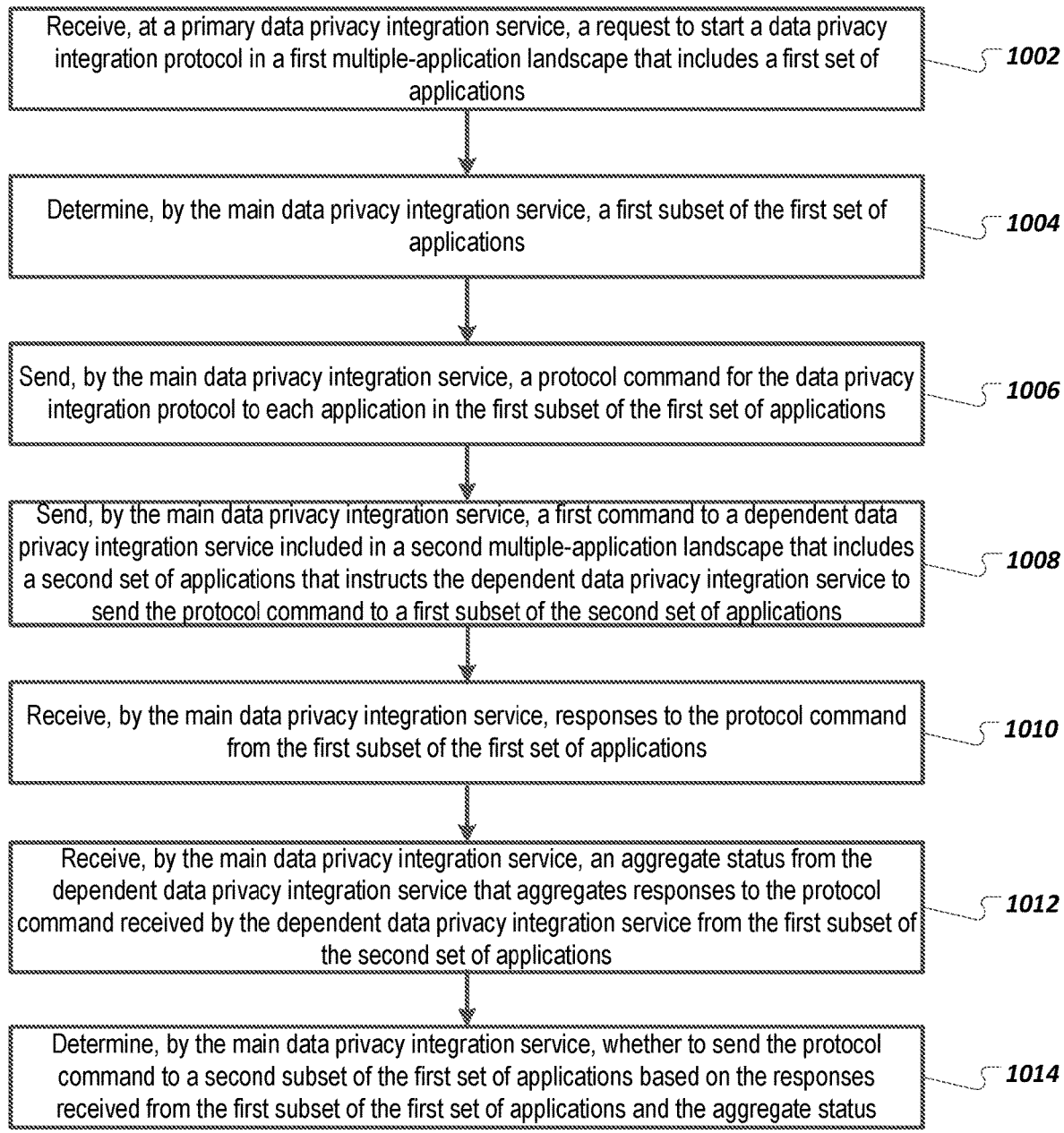
FIG. 10 is a flowchart of an example method for integrating data privacy integration protocols across system landscapes.

FIG. 10 is a flowchart of an example method 1000 for integrating data privacy integration protocols across system landscapes. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002, a request is received, at a primary data privacy integration service, to start a data privacy integration protocol in a first multiple-application landscape that includes a first set of applications.

At 1004, the primary data privacy integration service determines a first subset of the first set of applications. Determining the first subset of the first set of applications can include identifying applications in a first responder group of applications in the first multiple-application landscape. As another example, determining the first subset of the first set of applications can include determining applications that have an application score within a first range. Application scores can be relative scores based on one or more factors that determine a relative order of sending protocol commands to applications. Application scores can be based on factors such that applications that are more likely to fail a protocol operation, more likely to take less time to complete a protocol operation, or more likely to respond negatively to an inquiry are ordered to receive protocol commands sooner than other applications.

At 1006, a protocol command for the data privacy integration protocol is sent by the primary data privacy integration service to each application in the first subset of the first set of applications. The data privacy integration protocol can an integrated end-of-purpose protocol and the protocol command can be an inquiry regarding whether at least one object can be blocked. The data privacy integration protocol can be an aligned purpose disassociation protocol and the protocol command can be an inquiry regarding whether a purpose can be disassociated from an object.

At 1008, a first command is sent by the primary data privacy integration service to a dependent data privacy integration service included in a second multiple-application landscape that includes a second set of applications that instructs the dependent data privacy integration service to send the protocol command to a first subset of the second set of applications. The first multiple-application landscape and the second multiple-application landscape can be served by different data centers. The first command sent to the dependent data privacy integration service can be an instruction to send the protocol command to a number of responder groups in the second multiple-application landscape. The number of responder groups in the second multiple-application landscape can be determined based on a total number of responder groups in the first multiple-application landscape and a total number of responder groups in the second multiple-application landscape. As another example, the first command sent to the dependent data privacy integration service can instruct the dependent data privacy integration service to send the protocol command to applications in the second multiple-application landscape having an application score within the first range. Application scores can be normalized between the first multiple-application landscape and the second multiple-application landscape before sending the first command to the dependent data privacy integration service that instructs the dependent data privacy integration service to send the protocol command to applications in the second multiple-application landscape that have an application score within the first range. Although multiple-application landscapes are described, in some cases, the first landscape and/or the second landscape may include just one application. In such examples, a primary-dependent DPI service relationship can still be established and practiced.

At 1010, responses are received, by the primary data privacy integration service, to the protocol command from the first subset of the first set of applications.

At 1012, an aggregate status from the dependent data privacy integration service is received by the primary data privacy integration service that aggregates responses to the protocol command received by the dependent data privacy integration service from the first subset of the second set of applications.

At 1014, the primary data privacy integration service determines whether to send the protocol command to a second subset of the first set of applications based on the responses received from the first subset of the first set of applications and the aggregate status. The second subset of the first set of applications can include a second responder group of applications in the first multiple-application landscape. Determining whether to send the protocol command to a second subset of the first set of applications can include determining to halt processing of the request in response to determining that at least one of a response received from the first set of applications or the aggregate status does not indicate an affirmative response to a data privacy integration protocol inquiry. As another example, determining whether to send the protocol command to a second subset of the first set of applications can include determining to send the protocol command to the second subset of the first set of applications in response to determining that all responses received from the first set of applications and the aggregate status indicate an affirmative response to a data privacy integration protocol inquiry. In response to determining that all responses received from the first set of applications and the aggregate status indicate an affirmative response to the data privacy integration protocol inquiry, a second command can be sent to the dependent data privacy integration service that instructs the dependent data privacy integration service to send the protocol command to a second subset of the second set of applications. The second subset of the second set of applications can include applications in one or more next responder groups in the second multiple-application landscape that are determined based on a responder group number of the second responder group in the first multiple-application landscape, a total number of responder groups in the first multiple-application landscape, and a total number of responder groups in the second multiple-application landscape. As another example, the second subset of the first set of applications and the second subset of the second set of applications each include applications having application scores in a second range.

Figure 11:
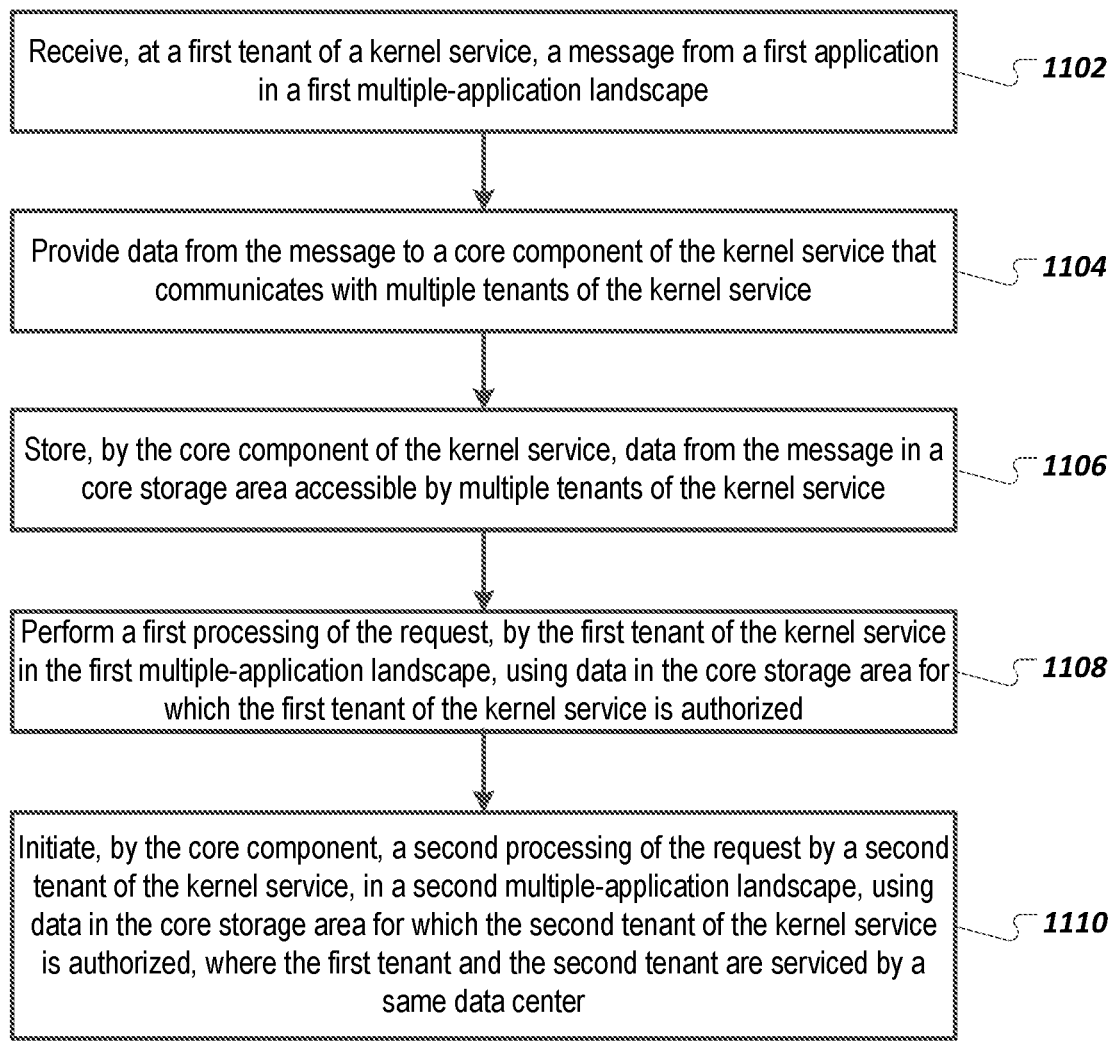
FIG. 11 is a flowchart of an example method for reducing resource consumption for cross-tenant kernel services.

FIG. 11 is a flowchart of an example method 1100 for reducing resource consumption for cross-tenant kernel services. Although kernel services are described, method 1100 can be applied to other types of services other than kernel services. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of a client, the server, or the other computing device. In some implementations, the method 1100 and related methods are executed by one or more components of the system 100 described above with respect to FIG. 1. For example, the method 1100 and related methods can be executed by the server 102 of FIG. 1.

At 1102, a message is received, at a first tenant of a kernel service, from a first application in a first multiple-application landscape. The kernel service can be a master data integration service and the message can be a request to store at least one master data object from the first application by the master data integration service to enable access to the at least one master data object to one or more downstream applications in the first multiple-application landscape and in the second multiple-application landscape. The kernel service can be a data privacy integration service and the message can be a request to determine whether an operation can be performed on each of at least one object. The operation can be object-blocking or disassociating a purpose from an object.

At 1104, data from the message is provided to a core component of the kernel service that communicates with multiple tenants of the kernel service.

At 1106, data from the message is stored, by the core component of the kernel service, in a common storage area accessible by multiple tenants of the kernel service. For MDI scenarios, the core storage area can include an original version of each master data object. In some examples, configuration metadata can be stored in the core storage area that indicates which applications in the first multiple-application landscape and in the second multiple-application landscape have access to which master data objects in the core storage area. For DPI scenarios, the data from the message stored in the core storage area can include object identifiers of the at least one object for which the operation may be performed.

At 1108, a first processing of the message is performed by the first tenant of the kernel service in the first multiple-application landscape, using data in the core storage area for which the first tenant of the kernel service is authorized. For DPI scenarios, the first processing performed by the first tenant of the kernel service can include the first tenant sending a first request to applications in the first multiple-application landscape for confirmation as to whether the operation can be performed on the at least one object. The first processing by the first tenant can include: dividing the at least one object into at least one first work package; storing first work package information for the at least one first work package in a first private data storage area private to the first tenant; and sending the at least one first work package to applications in the first multiple-application landscape to ask applications in the first multiple-application landscape whether the operation can be performed on each of the at least one object.

At 1110, a second processing of the message by a second tenant of the kernel service is initiated, by the core component of the kernel service, in a second multiple-application landscape, using data in the core storage area for which the second tenant of the kernel service is authorized. The first tenant of the kernel service and the second tenant of the kernel service are serviced by a same datacenter. For DPI scenarios, the second processing performed by the second tenant of the kernel service can include the second tenant sending a second request to applications in the second multiple-application landscape for confirmation as to whether the operation can be performed on the at least one object. The second processing by the second tenant can include: dividing the at least one object into at least one second work package, wherein the at least one second work package is a different division of the at least one object than the at least one first work package; storing second work package information for the at least one second work package in a second private data storage area private to the second tenant; and sending the at least one second work package to applications in the second multiple-application landscape to ask applications in the second multiple-application landscape whether the operation can be performed on each of the at least one object.

In some cases, the first tenant of the kernel service uses, during the first processing of the message, first data in a first storage area private to the first tenant of the kernel service along with the data in the core storage area for which the first tenant is authorized. The second tenant of the kernel service can use, during the second processing of the message, second data in a second storage area private to the second tenant of the kernel service along with the data in the core storage area for which the second tenant is authorized. For MDI scenarios, the first data in the first storage area private to the first tenant of the kernel service can include attribute information for at least one object that is accessible to applications in the first multiple-application landscape, but that is not accessible to applications in the second multiple-application landscape.

In some cases and for MDI scenarios, the first tenant can notify the downstream applications in the first multiple-application landscape of an availability of the at least one master data object in the core storage area and the second tenant can notify the downstream applications in the second multiple-application landscape of the availability of the at least one master data object in the core storage area.

For DPI scenarios, the first processing of the request can be integrated with the second processing of the request by determining whether each application in the first multiple-application landscape and each application in the second multiple-application landscape can perform the operation. An integration result for a data privacy integration protocol can be provided to the first application in response to the message received from the first application In some implementations, the method 1100 can be applied when the message is a request to create a ticket for an integrated personal data retrieval protocol. The message can describe personal data that is to be retrieved from applications in each landscape. An iPDR ticket that includes information that describes personal data that is to be retrieved by each application can be stored in the core storage area. Each application can therefore access the ticket from the core storage area. Additionally, the personal data that is provided by applications in different landscapes can then also be stored in the core storage area, so that the first tenant can read the provided personal data from the core storage area when packaging together a response for the iPDR ticket. Accordingly, computing resources can be reduced for iPDR protocol runs, by avoiding transferring data over a network.

The preceding figures and accompanying description illustrate example processes and computer-implementable techniques. But system 100 (or its software or other components) contemplates using, implementing, or executing any suitable technique for performing these and other tasks.

It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, at a first tenant of a kernel service, a message from a first application in a first multiple-application landscape; providing data from the message to a core component of the kernel service that communicates with multiple tenants of the kernel service; storing, by the core component of the kernel service, data from the message in a core storage area accessible by multiple tenants of the kernel service; performing, by the first tenant of the kernel service in the first multiple-application landscape, a first processing of the message using data in the core storage area for which the first tenant of the kernel service is authorized; and initiating, by the core component, a second processing of the message by a second tenant of the kernel service in a second multiple-application landscape using data in the core storage area for which the second tenant of the kernel service is authorized, wherein the second tenant of the kernel service and the first tenant of the kernel service are serviced by a same datacenter.

Example 2. The computer-implemented method of Example 1, further comprising: using, by the first tenant of the kernel service during the first processing of the message, first data in a first storage area private to the first tenant of the kernel service along with the data in the core storage area for which the first tenant is authorized; and using by the second tenant of the kernel service during the second processing of the message, second data in a second storage area private to the second tenant of the kernel service along with the data in the core storage area for which the second tenant is authorized.

Example 3. The computer-implemented method of Example 2, wherein the kernel service is a master data integration service.

Example 4. The computer-implemented method of Example 3, wherein the message is a request to store at least one master data object from the first application by the master data integration service to enable access to the at least one master data object to one or more downstream applications in the first multiple-application landscape and in the second multiple-application landscape.

Example 5. The computer-implemented method of Example 4, wherein the core storage area includes an original version of each master data object.

Example 6. The computer-implemented method of Example 4, further comprising storing configuration metadata in the core storage area that indicates which applications in the first multiple-application landscape and in the second multiple-application landscape have access to which master data objects in the core storage area.

Example 7. The computer-implemented method of Example 4, wherein the first data in the first storage area private to the first tenant of the kernel service includes attribute information for at least one object that is accessible to applications in the first multiple-application landscape, but that is not accessible to applications in the second multiple-application landscape.

Example 8. The computer-implemented method of Example 4, further comprising: notifying, by the first tenant, the downstream applications in the first multiple-application landscape of an availability of the at least one master data object in the core storage area; and notifying, by the second tenant, the downstream applications in the second multiple-application landscape of the availability of the at least one master data object in the core storage area.

Example 9. The computer-implemented method of Example 2, wherein the kernel service is a data privacy integration service.

Example 10. The computer-implemented method of Example 9, wherein the message is a request to determine whether an operation can be performed on each of at least one object.

Example 11. The computer-implemented method of Example 10, wherein the data from the message stored in the core storage area includes object identifiers of the at least one object.

Example 12. The computer-implemented method of Example 10, wherein the operation is object-blocking.

Example 13. The computer-implemented method of Example 10, wherein the operation is disassociating a purpose from an object.

Example 14. The computer-implemented method of Example 10, wherein: the first processing performed by the first tenant of the kernel service comprises the first tenant sending a first request to applications in the first multiple-application landscape for confirmation as to whether the operation can be performed on the at least one object; and the second processing performed by the second tenant of the kernel service comprises the second tenant sending a second request to applications in the second multiple-application landscape for confirmation as to whether the operation can be performed on the at least one object.

Example 15. The computer-implemented method of Example 10, further comprising: integrating, by the core component, the first processing of the request with the second processing of the request by determining whether each application in the first multiple-application landscape and each application in the second multiple-application landscape can perform the operation; and providing an integration result for a data privacy integration protocol to the first application in response to the message received from the first application.

Example 16. The computer-implemented method of Example 10, wherein the first processing by the first tenant comprises: dividing the at least one object into at least one first work package; storing first work package information for the at least one first work package in a first private data storage area private to the first tenant; and sending the at least one first work package to applications in the first multiple-application landscape to ask applications in the first multiple-application landscape whether the operation can be performed on each of the at least one object.

Example 17. The computer-implemented method of Example 16, wherein the second processing by the second tenant comprises: dividing the at least one object into at least one second work package, wherein the at least one second work package is a different division of the at least one object than the at least one first work package; storing second work package information for the at least one second work package in a second private data storage area private to the second tenant; and sending the at least one second work package to applications in the second multiple-application landscape to ask applications in the second multiple-application landscape whether the operation can be performed on each of the at least one object.

Example 18. A system comprising: one or more computers; and a computer-readable medium coupled to the one or more computers having instructions stored thereon which, when executed by the one or more computers, cause the one or more computers to perform operations comprising: receiving, at a first tenant of a kernel service, a message from a first application in a first multiple-application landscape; providing data from the message to a core component of the kernel service that communicates with multiple tenants of the kernel service; storing, by the core component of the kernel service, data from the message in a core storage area accessible by multiple tenants of the kernel service; performing, by the first tenant of the kernel service in the first multiple-application landscape, a first processing of the message using data in the core storage area for which the first tenant of the kernel service is authorized; and initiating, by the core component, a second processing of the message by a second tenant of the kernel service in a second multiple-application landscape using data in the core storage area for which the second tenant of the kernel service is authorized, wherein the second tenant of the kernel service and the first tenant of the kernel service are serviced by a same datacenter.

Example 19. The system of Example 18, wherein the operations further comprise: using, by the first tenant of the kernel service during the first processing of the message, first data in a first storage area private to the first tenant of the kernel service along with the data in the core storage area for which the first tenant is authorized; and using by the second tenant of the kernel service during the second processing of the message, second data in a second storage area private to the second tenant of the kernel service along with the data in the core storage area for which the second tenant is authorized.

Example 20. A non-transitory, computer-readable medium coupled to one or more processors and having instructions stored thereon which, when executed by the one or more processors, cause the one or more processors to perform operations, the operations comprising: receiving, at a first tenant of a kernel service, a message from a first application in a first multiple-application landscape; providing data from the message to a core component of the kernel service that communicates with multiple tenants of the kernel service; storing, by the core component of the kernel service, data from the message in a core storage area accessible by multiple tenants of the kernel service; performing, by the first tenant of the kernel service in the first multiple-application landscape, a first processing of the message using data in the core storage area for which the first tenant of the kernel service is authorized; and initiating, by the core component, a second processing of the message by a second tenant of the kernel service in a second multiple-application landscape using data in the core storage area for which the second tenant of the kernel service is authorized, wherein the second tenant of the kernel service and the first tenant of the kernel service are serviced by a same datacenter.

What is claimed is:

1. A computer-implemented method comprising:

receiving, at a first tenant of a data privacy integration kernel service that manages data privacy integration protocols for managing deletion of personal data in multiple-application landscapes, from a first application in a first multiple-application landscape, a message for a data privacy integration protocol comprising a request to determine whether a personal data removal operation for removing personal data for a data subject can be performed for a first object that represents the data subject;

providing data from the message to a core component of the data privacy integration kernel service that communicates with multiple tenants of the data privacy integration kernel service;

storing, by the core component of the data privacy integration kernel service, data from the message in a core storage area accessible by multiple tenants of the data privacy integration kernel service;

performing, by the first tenant of the data privacy integration kernel service in the first multiple-application landscape, a first processing of the message, using data in the core storage area for which the first tenant of the data privacy integration kernel service is authorized, to determine whether the personal data removal operation for removing personal data for the data subject can be performed, in the first tenant, for the first object that represents the data subject;

initiating, by the core component, a second processing of the message by a second tenant of the data privacy integration kernel service in a second multiple-application landscape, using data in the core storage area for which the second tenant of the data privacy integration kernel service is authorized, to determine whether the personal data removal operation for removing personal data can be performed, in the second tenant, for the first object that represents the data subject, wherein the second tenant of the data privacy integration kernel service and the first tenant of the data privacy integration kernel service are serviced by a same datacenter;

integrating, by the core component, the first processing of the request with the second processing of the request by determining, based on received votes, whether each application in the first multiple-application landscape and each application in the second multiple-application landscape can perform the personal data removal operation for removing personal data for the first object that represents the data subject; and in response to determining that each application in the first multiple-application landscape and each application in the second multiple-application landscape can perform the personal data removal operation for removing personal data for the first object that represents the data subject, sending a personal data removal command to each application in the first multiple-application landscape and the second multiple-application landscape, including the first application, resulting in the personal data removal command being performed in at least the first application;

providing an integration result for the data privacy integration protocol to the first application in response to the message received from the first application.

2. The computer-implemented method of claim 1, further comprising:
using, by the first tenant of the data privacy integration kernel service during the first processing of the message, first data in a first storage area private to the first tenant of the data privacy integration kernel service along with the data in the core storage area for which the first tenant is authorized; and
using by the second tenant of the data privacy integration kernel service during the second processing of the message, second data in a second storage area private to the second tenant of the data privacy integration kernel service along with the data in the core storage area for which the second tenant is authorized.

3. The computer-implemented method of claim 2, wherein the message includes at least one other object other than the first object and the first processing by the first tenant comprises:
dividing objects in the message into at least one first work package;
storing first work package information for the at least one first work package in the first storage area private to the first tenant; and
sending the at least one first work package to applications in the first multiple-application landscape to ask applications in the first multiple-application landscape whether the personal data removal operation can be performed on each object in the at least one first work package.

4. The computer-implemented method of claim 3, wherein the second processing by the second tenant comprises:
dividing objects in the message into at least one second work package, wherein the at least one second work package is a different division of the objects in the message than the at least one first work package;
storing second work package information for the at least one second work package in the second storage area private to the second tenant; and
sending the at least one second work package to applications in the second multiple-application landscape to ask applications in the second multiple-application landscape whether the personal data removal operation can be performed on each of the objects in the at least one second work package.

5. The computer-implemented method of claim 1, wherein the data from the message stored in the core storage area includes an object identifier of the first object.

6. The computer-implemented method of claim 1, wherein:
the personal data removal operation is object-blocking comprising deleting the first object after expiration of any retention periods associated with the first object; and
the personal data removal command is a command to block the first object.

7. The computer-implemented method of claim 6, further comprising identifying a retention period associated with the first object.

8. The computer-implemented method of claim 7, further comprising maintaining the first object in a blocked state in the first multiple-application landscape for a duration of the retention period associated with the first object.

9. The computer-implemented method of claim 8, wherein the first application is blocked from processing the first object while the first object is maintained in the blocked state.

10. The computer-implemented method of claim 9, wherein an authorized application is authorized to access the first object while the first object is maintained in the blocked state.

11. The method of claim 10, further comprising deleting the first object after expiration of any retention periods associated with the first object.

12. The computer-implemented method of claim 1, wherein:
the personal data removal operation is disassociating a purpose from the first object which can lead to subsequent blocking of the first object once no purposes are associated with the first object; and
the personal data removal command is a command to disassociate the purpose from the first object.

13. The computer-implemented method of claim 1, wherein:
the first processing performed by the first tenant of the data privacy integration kernel service comprises the first tenant sending a first request to applications in the first multiple-application landscape for a respective vote indicating whether the personal data removal operation can be performed on the first object; and
the second processing performed by the second tenant of the data privacy integration kernel service comprises the second tenant sending a second request to applications in the second multiple-application landscape for a respective vote indicating whether the personal data removal operation can be performed on the first object.

14. A system comprising:
one or more computers; and
a computer-readable medium coupled to the one or more computers having instructions stored thereon which, when executed by the one or more computers, cause the one or more computers to perform operations comprising:
receiving, at a first tenant of a data privacy integration kernel service that manages data privacy integration protocols for managing deletion of personal data in multiple-application landscapes, from a first application in a first multiple-application landscape, a message for a data privacy integration protocol comprises a request to determine whether a personal data removal operation for removing personal data for a data subject can be performed for a first object that represents the data subject;
providing data from the message to a core component of the data privacy integration kernel service that communicates with multiple tenants of the data privacy integration kernel service;
storing, by the core component of the data privacy integration kernel service, data from the message in a core storage area accessible by multiple tenants of the data privacy integration kernel service;
performing, by the first tenant of the data privacy integration kernel service in the first multiple-application landscape, a first processing of the message using data in the core storage area for which the first tenant of the data privacy integration kernel service is authorized, to determine whether the personal data removal operation for removing personal data for the data subject can be performed, in the first tenant, for the first object that represents the data subject;

initiating, by the core component, a second processing of the message by a second tenant of the data privacy integration kernel service in a second multiple-application landscape using data in the core storage area for which the second tenant of the data privacy integration kernel service is authorized, to determine whether the personal data removal operation for removing personal data can be performed, in the second tenant, for the first object that represents the data subject, wherein the second tenant of the data privacy integration kernel service and the first tenant of the data privacy integration kernel service are serviced by a same datacenter;

integrating, by the core component, the first processing of the request with the second processing of the request by determining, based on received votes, whether each application in the first multiple-application landscape and each application in the second multiple-application landscape can perform the personal data removal operation for removing personal data for the first object that represents the data subject; and in response to determining that each application in the first multiple-application landscape and each application in the second multiple-application landscape can perform the personal data removal operation for removing personal data for the first object that represents the data subject, sending a personal data removal command to each application in the first multiple-application landscape and the second multiple-application landscape, including the first application, resulting in the personal data removal command being performed in at least the first application;

providing an integration result for the data privacy integration protocol to the first application in response to the message received from the first application.

15. The system of claim 14, wherein the operations further comprise:

using, by the first tenant of the data privacy integration kernel service during the first processing of the message, first data in a first storage area private to the first tenant of the data privacy integration kernel service along with the data in the core storage area for which the first tenant is authorized; and using by the second tenant of the data privacy integration kernel service during the second processing of the message, second data in a second storage area private to the second tenant of the data privacy integration kernel service along with the data in the core storage area for which the second tenant is authorized.

16. The system of claim 14, wherein the operations further comprise identifying a retention period associated with the first object.

17. The system of claim 16, wherein the operations further comprise maintaining the first object in a blocked state in the first multiple-application landscape for a duration of the retention period associated with the first object.

18. A non-transitory, computer-readable medium coupled to one or more processors and having instructions stored thereon which, when executed by the one or more processors, cause the one or more processors to perform operations, the operations comprising:

receiving, at a first tenant of a data privacy integration kernel service that manages data privacy integration protocols for managing deletion of personal data in multiple-application landscapes, from a first application in a first multiple-application landscape, a message for a data privacy integration protocol comprising a request to determine whether a personal data removal operation for removing personal data for a data subject can be performed for a first object that represents the data subject;

providing data from the message to a core component of the data privacy integration kernel service that communicates with multiple tenants of the data privacy integration kernel service;

storing, by the core component of the data privacy integration kernel service, data from the message in a core storage area accessible by multiple tenants of the data privacy integration kernel service;

performing, by the first tenant of the data privacy integration kernel service in the first multiple-application landscape, a first processing of the message, using data in the core storage area for which the first tenant of the data privacy integration kernel service is authorized, to determine whether the personal data removal operation for removing personal data for the data subject can be performed, in the first tenant, for the first object that represents the data subject;

initiating, by the core component, a second processing of the message by a second tenant of the data privacy integration kernel service in a second multiple-application landscape, using data in the core storage area for which the second tenant of the data privacy integration kernel service is authorized, to determine whether the personal data removal operation for removing personal data can be performed, in the second tenant, for the first object that represents the data subject, wherein the second tenant of the data privacy integration kernel service and the first tenant of the data privacy integration kernel service are serviced by a same datacenter;

integrating, by the core component, the first processing of the request with the second processing of the request by determining, based on received votes, whether each application in the first multiple-application landscape and each application in the second multiple-application landscape can perform the personal data removal operation for removing personal data for the first object that represents the data subject; and in response to determining that each application in the first multiple-application landscape and each application in the second multiple-application landscape can perform the personal data removal operation for removing personal data for the first object that represents the data subject, sending a personal data removal command to each application in the first multiple-application landscape and the second multiple-application landscape, including the first application, resulting in the personal data removal command being performed in at least the first application;

providing an integration result for the data privacy integration protocol to the first application in response to the message received from the first application.

19. The computer-readable medium of claim 18, wherein the operations further comprise identifying a retention period associated with the first object.

20. The computer-readable medium of claim 19, wherein the operations further comprising maintaining the first object in a blocked state in the first multiple-application landscape for a duration of the retention period associated with the first object.

* * * * *